US008632388B2

(12) United States Patent
Davis et al.

(10) Patent No.: US 8,632,388 B2
(45) **Date of Patent: *Jan. 21, 2014**

(54) GAMING DEVICE AND METHOD OF PROVIDING AN ADJUSTED PAYTABLE FOR A NUMBER OF FUTURE PLAYS OF A GAME

(75) Inventors: Dwayne A. Davis, Reno, NV (US); Michael M. Oberberger, Reno, NV (US); Scott T. Hilbert, Sparks, NV (US); Alexandria E. Sutich, Reno, NV (US)

(73) Assignee: IGT, Las Vegas, NV (US)

( * ) Notice: Subject to any disclaimer, the term of this patent is extended or adjusted under 35 U.S.C. 154(b) by 1137 days.

This patent is subject to a terminal disclaimer.

(21) Appl. No.: 12/270,500

(22) Filed: Nov. 13, 2008

(65) Prior Publication Data

US 2010/0120506 A1 May 13, 2010

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl.
USPC .................. 463/20; 463/25; 463/26; 463/27; 463/28; 463/29

(58) Field of Classification Search
USPC ................................................ 463/20, 16, 25
See application file for complete search history.

(56) References Cited

U.S. PATENT DOCUMENTS

| | | | |
|---|---|---|---|
| 4,743,022 | A | 5/1988 | Wood |
| 5,019,973 | A | 5/1991 | Wilcox et al. |

(Continued)

FOREIGN PATENT DOCUMENTS

| | | |
|---|---|---|
| AU | 200065501 | 5/2001 |
| AU | 771847 | 4/2004 |

(Continued)

OTHER PUBLICATIONS

Turbo Reel advertisement, published by Barcrest in German prior to Nov. 13, 2008 (with English translation of the text).

*Primary Examiner* — Kevin Y Kim
(74) *Attorney, Agent, or Firm* — Neal, Gerber & Eisenberg LLP

(57) ABSTRACT

One embodiment of the present disclosure provides a game operable upon a wager by a player which initially employs an initial or default paytable. The gaming device enables a player to place wagers on plays of the game. The gaming device displays the game outcomes and provides the player with any awards based on the game outcomes in accordance with the default paytable. Upon an occurrence of a triggering event, a bonus mode is triggered. In one embodiment, when the bonus mode is triggered, the gaming device offers to replace the default paytable with a different one of the paytables for a limited number of future plays of the game, if the player agrees to make an additional wager on each of those future plays of the game. If the player chooses to accept the offer, the gaming device determines outcomes and provides any awards for the limited number of future plays in accordance with the new paytable, as long as the player continues placing the additional wager for each of those plays. If the player chooses not to accept the offer to replace the default paytable with a new paytable, the gaming device displays the number of future plays of the game without requiring the additional wager and provides any awards for those plays in accordance with the default paytable.

22 Claims, 18 Drawing Sheets

(56) References Cited

U.S. PATENT DOCUMENTS 5,123,649 A 6/1992 Tiberio
5,178,390 A 1/1993 Okada
5,248,142 A 9/1993 Breeding
5,251,897 A 10/1993 Fulton
5,393,067 A 2/1995 Paulsen et al.
5,411,257 A 5/1995 Fulton
5,494,287 A 2/1996 Manz
5,570,885 A 11/1996 Ornstein
5,613,912 A 3/1997 Slater
5,655,961 A 8/1997 Acres et al.
5,788,574 A 8/1998 Ornstein et al.
5,806,855 A 9/1998 Cherry
5,820,460 A 10/1998 Fulton
5,839,730 A 11/1998 Pike
5,851,147 A 12/1998 Stupak et al.
5,876,284 A 3/1999 Acres et al.
5,911,418 A 6/1999 Adams
6,004,207 A 12/1999 Wilson, Jr. et al.
6,012,983 A 1/2000 Walker et al.
6,062,981 A 5/2000 Luciano, Jr.
6,068,552 A 5/2000 Walker et al.
6,077,163 A 6/2000 Walker et al.
6,155,925 A 12/2000 Giobbi et al.
6,159,097 A 12/2000 Gura
6,186,894 B1 2/2001 Mayeroff
6,203,429 B1 3/2001 Demar et al.
6,213,877 B1 4/2001 Walker et al.
6,217,448 B1 4/2001 Olsen
6,224,483 B1 5/2001 Mayeroff
6,227,969 B1 5/2001 Yoseloff
6,231,442 B1 5/2001 Mayeroff
6,244,957 B1 6/2001 Walker et al.
6,290,603 B1 9/2001 Luciano, Jr.
6,319,127 B1 11/2001 Walker et al.
6,358,147 B1 3/2002 Jaffe et al.
6,364,768 B1 4/2002 Acres et al.
6,375,570 B1 4/2002 Poole
6,394,902 B1 5/2002 Glavich et al.
6,419,578 B1 * 7/2002 Moody et al. .................. 463/13
6,425,823 B1 7/2002 Byrne
RE37,885 E 10/2002 Acres et al.
6,468,156 B1 10/2002 Hughs-Baird et al.
6,491,584 B2 12/2002 Graham et al.
6,517,073 B1 2/2003 Vancura
6,520,856 B1 2/2003 Walker et al.
6,569,013 B1 5/2003 Taylor
6,589,115 B2 7/2003 Walker et al.
6,607,195 B2 8/2003 Vancura
6,612,927 B1 9/2003 Slomiany et al.
6,634,942 B2 10/2003 Walker et al.
6,702,289 B1 3/2004 Feola
6,702,675 B2 3/2004 Poole et al.
6,712,693 B1 3/2004 Hettinger
6,726,565 B2 4/2004 Hughs-Baird
6,746,016 B2 6/2004 Perrie et al.
6,769,986 B2 8/2004 Vancura
6,786,824 B2 9/2004 Cannon
6,802,778 B1 10/2004 Lemay et al.
6,969,317 B2 11/2005 Walker et al.
7,029,395 B1 4/2006 Baerlocher
7,052,395 B2 5/2006 Glavich et al.
7,140,964 B2 11/2006 Walker et al.
7,156,739 B2 1/2007 Walker et al.
7,198,569 B2 4/2007 Wolf et al.
7,258,611 B2 8/2007 Bigelow, Jr. et al.
7,291,068 B2 11/2007 Bryant et al.
7,318,774 B2 1/2008 Bryant et al.
7,329,179 B2 2/2008 Baerlocher
7,338,370 B2 3/2008 Oles et al.
7,351,146 B2 4/2008 Kaminkow
7,357,714 B2 4/2008 Tessmer et al.
7,371,173 B2 5/2008 Gatto et al.
7,374,486 B2 5/2008 Baerlocher
7,384,334 B2 6/2008 Glavich et al.
7,419,429 B2 9/2008 Taylor
7,465,227 B2 12/2008 Baerlocher
7,470,185 B2 12/2008 Baerlocher
7,563,167 B2 7/2009 Walker et al.
7,588,496 B2 9/2009 Van Asdale
7,727,061 B2 6/2010 Taylor
7,740,536 B2 6/2010 Pederson et al.
7,771,274 B2 8/2010 Walker et al.
7,828,648 B2 11/2010 Jackson
8,002,621 B2 8/2011 Mattice et al.
2001/0054794 A1 12/2001 Cole et al.
2002/0132660 A1 9/2002 Taylor
2002/0147040 A1 10/2002 Walker et al.
2002/0165023 A1 11/2002 Brosnan et al.
2002/0193158 A1 12/2002 Weiss et al.
2003/0114217 A1 6/2003 Walker et al.
2003/0144053 A1 7/2003 Michaelson
2003/0207713 A1 11/2003 Taylor
2003/0216170 A1 11/2003 Walker et al.
2004/0023713 A1 2/2004 Wolf et al.
2004/0038724 A1 2/2004 Asdale
2004/0063492 A1 4/2004 Baerlocher et al.
2004/0075711 A1 4/2004 Silverbrook et al.
2004/0102238 A1 5/2004 Taylor
2004/0147308 A1 7/2004 Walker et al.
2004/0204218 A1 10/2004 Hughs-Baird
2004/0242313 A1 12/2004 Munoz
2005/0009597 A1 1/2005 Daly
2005/0054429 A1 3/2005 Baerlocher et al.
2005/0060050 A1 3/2005 Baerlocher
2005/0071023 A1 3/2005 Gilliland et al.
2005/0085294 A1 4/2005 Walker et al.
2005/0085295 A1 4/2005 Walker et al.
2005/0096123 A1 5/2005 Cregan et al.
2005/0202863 A1 9/2005 Macaulay
2005/0208992 A1 9/2005 Randall
2005/0282625 A1 12/2005 Nicely
2006/0025193 A1 2/2006 Gail et al.
2006/0035701 A1 2/2006 Walker et al.
2006/0040728 A1 2/2006 Fuller
2006/0046816 A1 3/2006 Walker et al.
2006/0046835 A1 3/2006 Walker et al.
2006/0058095 A1 3/2006 Berman et al.
2006/0063580 A1 3/2006 Nguyen et al.
2006/0068903 A1 3/2006 Walker et al.
2006/0089195 A1 4/2006 Walker et al.
2006/0142077 A1 6/2006 Miles et al.
2006/0172794 A1 8/2006 Walker et al.
2006/0202415 A1 9/2006 Taylor
2006/0211489 A1 9/2006 Walker et al.
2006/0217187 A1 9/2006 Walker et al.
2006/0217188 A1 9/2006 Walker et al.
2006/0247030 A1 11/2006 Walker et al.
2006/0247031 A1 11/2006 Walker et al.
2006/0248025 A1 11/2006 Walker et al.
2006/0252512 A1 11/2006 Walker et al.
2006/0252515 A1 11/2006 Walker et al.
2006/0287071 A1 12/2006 Walker et al.
2006/0287072 A1 12/2006 Walker et al.
2007/0021182 A1 1/2007 Gauselmann
2007/0054726 A1 3/2007 Muir et al.
2007/0060252 A1 3/2007 Taylor
2007/0087804 A1 4/2007 Knowles et al.
2007/0117612 A1 5/2007 Walker et al.
2007/0135207 A1 6/2007 Tarantino
2007/0213123 A1 9/2007 Walker et al.
2007/0287532 A1 12/2007 Jackson
2008/0064491 A1 3/2008 Taylor
2008/0076496 A1 3/2008 Baerlocher et al.
2008/0076503 A1 3/2008 Mattice et al.
2008/0076531 A1 3/2008 Baerlocher et al.
2008/0076532 A1 3/2008 Graham et al.
2008/0076534 A1 3/2008 Iddings et al.
2008/0076542 A1 3/2008 Iddings et al.
2008/0076576 A1 3/2008 Graham et al.
2008/0085771 A1 4/2008 Iddings et al.
2008/0085772 A1 4/2008 Iddings et al.
2008/0102934 A1 5/2008 Tan
2008/0113759 A1 5/2008 Baerlocher
2008/0167105 A1 7/2008 Kaminkow

(56) References Cited

U.S. PATENT DOCUMENTS

| | | | | |
|---|---|---|---|---|
| 2008/0182650 | A1 | 7/2008 | Randall et al. | |
| 2008/0182655 | A1 | 7/2008 | DeWaal et al. | |
| 2008/0194316 | A1 | 8/2008 | Baerlocher | |
| 2008/0214280 | A1 | 9/2008 | Baerlocher | |
| 2008/0214292 | A1 | 9/2008 | Bryant et al. | |
| 2008/0220851 | A1 | 9/2008 | Glavich et al. | |
| 2008/0318668 | A1 | 12/2008 | Ching et al. | |
| 2009/0042652 | A1 | 2/2009 | Baerlocher et al. | |
| 2009/0088239 | A1 | 4/2009 | Iddings et al. | |
| 2009/0117989 | A1* | 5/2009 | Arezina et al. | 463/20 |
| 2009/0124316 | A1 | 5/2009 | Baerlocher et al. | |
| 2009/0170588 | A1* | 7/2009 | Baerlocher | 463/20 |
| 2010/0210338 | A1 | 8/2010 | Taylor | |
| 2011/0034236 | A1 | 2/2011 | Jackson | |

FOREIGN PATENT DOCUMENTS

| | | | |
|---|---|---|---|
| EP | 0 558 307 | A2 | 2/1993 |
| EP | 753 331 | A2 | 1/1997 |
| EP | 874 337 | A1 | 10/1998 |
| EP | 0945837 | | 3/1999 |
| EP | 1 076 321 | A1 | 2/2001 |
| EP | 1 195 730 | A2 | 4/2002 |
| EP | 1 513 114 | A2 | 3/2005 |
| GB | 2 137 392 | A | 10/1984 |
| GB | 2 292 245 | | 2/1996 |
| GB | 2 322 217 | A | 8/1998 |
| GB | 2 382 911 | | 6/2003 |
| GB | 2 387 950 | A | 10/2003 |
| WO | WO 85/00910 | | 2/1985 |
| WO | WO 03/026757 | | 4/2003 |
| WO | 2005010831 | | 3/2005 |
| WO | WO 2005/083599 | A1 | 9/2005 |
| WO | 2006002241 | | 1/2006 |
| WO | 2006004831 | | 1/2006 |
| WO | WO 2006/015442 | A1 | 2/2006 |
| WO | WO 2006/017431 | | 2/2006 |
| WO | 2007090270 | | 8/2007 |
| WO | WO 2007/090270 | | 8/2007 |

* cited by examiner

FIG. 4A

200a

| Winning Combination | Award |
|---|---|
| AAA | 100 |
| BBB | 150 |
| CCC | 250 |
| DDD | 300 |
| EEE | 500 |
| | |

Average Expected Payback = 90%

FIG. 4B

200b

| Winning Combination | Award |
|---|---|
| AAA | 200 |
| BBB | 300 |
| CCC | 500 |
| DDD | 600 |
| EEE | 1000 |
| | |

Average Expected Payback = 180%

GAMING DEVICE AND METHOD OF PROVIDING AN ADJUSTED PAYTABLE FOR A NUMBER OF FUTURE PLAYS OF A GAME

BACKGROUND

Gaming devices which provide players awards in primary or base games are well known. Gaming devices generally require the player to place or make a wager to activate the primary or base game. In many of these gaming devices, the award is based on the player obtaining a winning symbol or symbol combination and based on the amount of the wager (e.g., the higher the wager, the higher the award). Symbols or symbol combinations which are less likely to occur usually provide higher awards.

Many known slot gaming devices include a plurality of reels. In these gaming devices, the player initiates the spinning of the reels by making one or more wagers on one or more paylines. Such gaming devices may have one, three, five, nine, fifteen, twenty-five or any other suitable number of paylines which extend horizontally, vertically, or diagonally. The player wagers on a player selected number or combination of paylines, such as one, two, three, five, ten or fifteen paylines and the reels are activated to spin.

After the reels spin to generate a plurality of symbols, the gaming device analyzes the generated symbols to determine if the gaming device has randomly generated a winning symbol or winning symbol combination on one or more of the wagered on paylines.

A paytable determines the award that a player wins if a designated winning symbol or designated winning symbol combination occurs on an activated payline. Typically, a line pay award is calculated by multiplying the award value for the winning symbol or winning symbol combination by the amount wagered upon the payline upon which the winning symbol or winning symbol combination appears. Such calculated awards are provided to the player. In conventional slot gaming machines, for example, if a player wagers one credit on a first payline and another credit on a second payline, the player has activated two paylines. Making an additional wager activates another payline or increases the wager played on one of the first or second activated paylines. This creates a play of the game having a certain number of activated paylines by a certain number of credits per payline.

Slot gaming machines are typically set to pay back on average a certain percentage of the amount of money wagered by players. The average percentage of money wagered that is paid back to the player as an award is sometimes called the average expected payback or average expected payback percentage. The average payback provided by a gaming machine is determined by the paytable(s) of the gaming machine. For example, for a slot game, the paytable determines each of the awards that will be provided to a player for each of the winning symbols or winning symbol combinations that appear on an activated payline. Gaming devices typically have predetermined paytables including predetermined winning combinations and predetermined awards. Although the actual payback may vary, the expected payback for a gaming machine is predetermined and remains constant throughout game play.

Gaming device manufacturers constantly strive to make gaming devices that provide as much enjoyment and excitement as possible. Players enjoy playing for high awards. Thus, to increase player enjoyment and excitement, a need exists to provide new gaming machines which vary award returns and risk.

SUMMARY

Various embodiments of the present disclosure provide a gaming system, gaming device, and method which offers a paytable enhancement feature that can be applied to any suitable game, such as poker or slot.

In one embodiment, the gaming device of the present disclosure includes a primary game operable upon a wager by a player. The gaming device employs an initial or default paytable for the primary game. In operation, the gaming device enables a player to place primary game wagers on plays of the primary game. The gaming device displays the primary game outcomes and provides the player with any awards associated with the primary game outcomes in accordance with the initial or default paytable. Upon an occurrence of a suitable triggering event, a bonus mode is initiated. In one embodiment, the bonus mode is associated with a designated number of plays of a secondary game. Once the bonus mode is initiated, the gaming device displays a plurality of selectable options associated with the secondary game. In one embodiment, the plurality of selectable options include a first or default option and at least one second different option. The gaming device enables the player to select one of the displayed options. If the player selects the first or default option, the gaming device displays the designated number of plays of the secondary game without requiring an additional wager by the player and employing the default paytable. If the player selects the second different bonus option, the gaming device enables the player to play the designated number of plays of the secondary game, but each of those plays requires an additional wager and employs a second different paytable. In certain embodiments, the second different paytable may be favorable or advantageous for the player. As long as the player continues to make the additional wager on each of the designated number of plays of the secondary game, the gaming device determines secondary game outcomes and provides any awards for those plays in accordance with the second different paytable.

In one embodiment, the primary game and the secondary game are different games. In another embodiment, the primary game and the secondary game are the same game (but have different paytables).

In one embodiment, upon an occurrence of a triggering event, the gaming device of the present disclosure provides an adjusted paytable as a bonus that applies to a designated number of future plays of a game. To obtain the adjusted paytable, the player agrees to make an additional wager on each of the designated number of future plays of the game. It should be appreciated that, in one embodiment, once the player commits to making the additional wager to obtain the new or adjusted paytable for a designated number of bonus plays, the player must continue placing the additional wager for each of the bonus plays, or the bonus is cancelled. If the player cancels the bonus, the player can adjust the wager to their liking and can resume playing the game employing the default paytable, but the player cannot continue through any remaining bonus plays.

In various embodiments, replacing the default paytable with the new paytable is advantageous or better for the player in one or more ways and to different extents. In one preferred embodiment, if a player accepts the offer to replace the default paytable with a new paytable when the bonus mode is triggered (e.g., by agreeing to make the additional wager on a designated number of future plays of the game), the new paytable has a higher average expected payback than the default paytable. Thus, the player gains the opportunity to play the game with a paytable that has a higher average expected payback than the default paytable. In other embodiments, the game changes in other ways based on the paytable employed in the bonus mode. For example, the new paytable may provide one or more benefits over the default paytable including: (i) a higher average expected payback; (ii) higher awards; (iii) higher awards for designated combinations; (iv) higher probabilities of designated symbols or winning symbol combination occurring; (v) higher multipliers; (vi) random multipliers; (vii) more winning symbol combinations; (viii) a different number of symbols; (ix) different types of symbols; (x) different proportion and/or ordering of symbols; (xi) different types of winning symbol combinations; (xii) extra wild symbols; (xiii) extra bonus-triggering symbols; (xiv) any other feature that provides the player with an advantage; and (xv) any combination of these. It should be appreciated, however, that to get the benefit of the new paytable, the player must place the additional wager for each of the designated number of future plays of the game during the bonus mode.

In one embodiment, when the bonus mode is triggered, the gaming device provides the player with a plurality of different bonus offers or options for adjusting the paytable employed for a designated number of future plays of the game. In one such embodiment, each of the bonus options is associated with one of a plurality of different paytables and a respective additional wager amount. For example, a player is playing a game of slot at a rate of $1.00 per play or spin. The game initially employs a first or default paytable having an average expected payback of 90%. Upon an occurrence of the designated triggering event in a play of the game, the bonus mode is triggered. Upon initiation of the bonus mode, the gaming device provides the player with the following bonus options: (a) the player can place an additional wager of $2.00 on the next play of the game employing a second paytable having an average expected payback of 180%; (b) the player can place an additional wager of $3.00 on the next play of the game employing a third paytable having an average expected payback of 270%; or (c) the player can choose to place no additional wager on the next play the game employing the default paytable. If the player chooses the option to place no additional wager on the next play of the game, the gaming device does not replace the default paytable with one of the new, different paytables. That is, the gaming device employs the default paytable to determine awards for the next play of the game. If the player chooses to place one of the additional wager amounts on the next play of the game (i.e., $2.00 or $3.00), the gaming device will employ the paytable which corresponds to the additional wager amount placed for the next play of the game.

In one embodiment, when the bonus mode is triggered, the gaming device provides the player with an offer or option to replace the default paytable with a new, enhanced paytable as a bonus for making an additional wager on a predetermined number of future plays of the game, such as 1 play, 5 plays, 10 plays, or 20 plays. If the player chooses to accept the offer, the player enters into a commitment to place the additional wager for each of the predetermined number of future plays of the game. That is, the player must place the additional wager for all plays during the bonus mode or the bonus mode will be cancelled. Once the player completes the predetermined number of plays employing the new paytable, the bonus mode ends. The player is no longer required to make the increased or additional wager once the bonus mode ends. That is, the player can resume making any suitable wager on further plays of the game, in accordance with the normal or default wagering options provided to the player by the gaming device, and the default paytable is employed for those plays of the game.

In one embodiment, when the player commits or agrees to make the additional wager for a plurality of plays of the game in the bonus mode, the new paytable employed is the same for each of the bonus plays. In other embodiments, the gaming device offers dynamic adjustment of the payable during the bonus mode. In one such embodiment, when the bonus mode is triggered, the gaming device offers the player an escalating paytable as a bonus for making an additional wager on a plurality of future plays of the game. In one such embodiment, the paytable ramps up or escalates over successive plays of the game during the bonus mode. For example, when the bonus mode is triggered, the gaming device offers the player four future plays of the game consecutively employing a series of four different paytables having average expected paybacks that are two times, three times, four times, and five times the average expected payback of the default paytable, respectively.

To accept the bonus offer and thus obtain the benefit of the escalating paytable, the player must commit to placing an additional wager for each of those future plays. In one embodiment, the additional wager required for each of the future plays of the game is the same, regardless of the paytable employed for that play. In another embodiment, the additional wager required for each of the future plays is different. In one such embodiment, the additional wager required for each of the future plays is based on the paytable employed for that play of the game. For instance, referring again to the above example, the player must wager an additional two credits for the first play, an additional three credits for the second play, an additional four credits for the third play, and an additional five credits for the fourth play. In one embodiment, the gaming device enables the player to pay a pre-set additional wager amount upfront to obtain a specific series of paytables for a predetermined number of future plays of the game. For example, rather than requiring the player to place the respective additional wagers prior to each of the four bonus plays (i.e., an additional two credits for the first play, an additional three credits for the second play, an additional four credits for the third play, and an additional five credits for the fourth play), the player pays a predefined wager amount of fourteen credits (i.e., two+three+four+five credits) upfront or upon accepting the bonus offer. The gaming device then provides the four future plays of the game employing the adjusted or escalating paytable without interruption.

In one embodiment, when the bonus mode is triggered, the gaming device provides a plurality of bonus options for changing or adjusting the paytable employed during the bonus mode, including one or more custom bonus options or offers. In one such embodiment, selecting a custom bonus option enables the player to create or structure a bonus that applies to a number of future plays of the game according to player preference. In such an embodiment, the player has the opportunity to determine or define one or more bonus parameters, such as the number of bonus plays, which paytable or paytables will be employed for those bonus plays, and in what order, etc. In another embodiment, custom bonus options are operator defined. In various embodiments, custom bonus options are created for and provided to certain players based on player tracking, player status, game play or betting history, any other suitable criteria, or any combination of these.

It is therefore an advantage of the present disclosure to provide a bonus feature which enables a player to have a direct impact on the paytable that is employed for one or more plays of a game.

Another advantage of the present disclosure is to provide a bonus mode or feature which offers a player increased variation in wagering and potential to win large awards.

Additional features and advantages are described herein, and will be apparent from the following Detailed Description and the figures.

BRIEF DESCRIPTION OF THE FIGURES

FIGS. 4A and 4B illustrate different example paytables of one embodiment of the present disclosure, wherein each of the paytables has an average expected payback.

DETAILED DESCRIPTION

The present disclosure may be implemented in various configurations for gaming machines or gaming devices, including but not limited to: (1) a dedicated gaming machine or gaming device, wherein the computerized instructions for controlling any games (which are provided by the gaming machine or gaming device) are provided with the gaming machine or gaming device prior to delivery to a gaming establishment; and (2) a changeable gaming machine or gaming device, where the computerized instructions for controlling any games (which are provided by the gaming machine or gaming device) are downloadable to the gaming machine or gaming device through a data network when the gaming machine or gaming device is in a gaming establishment. In one embodiment, the computerized instructions for controlling any games are executed by at least one central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
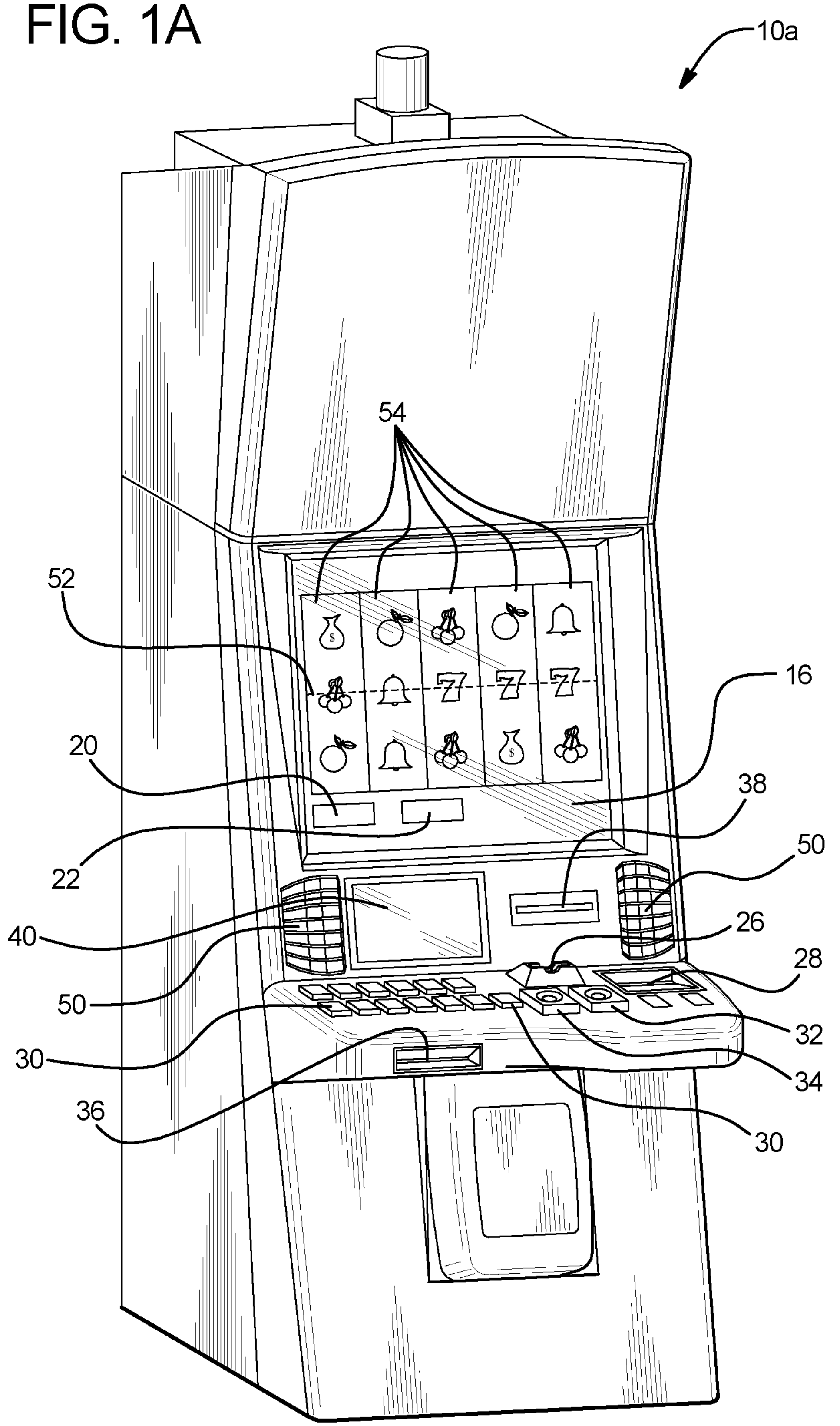
FIGS. 1A and 1B are perspective views of example alternative embodiments of the gaming device of the present disclosure.
Figure 1B:
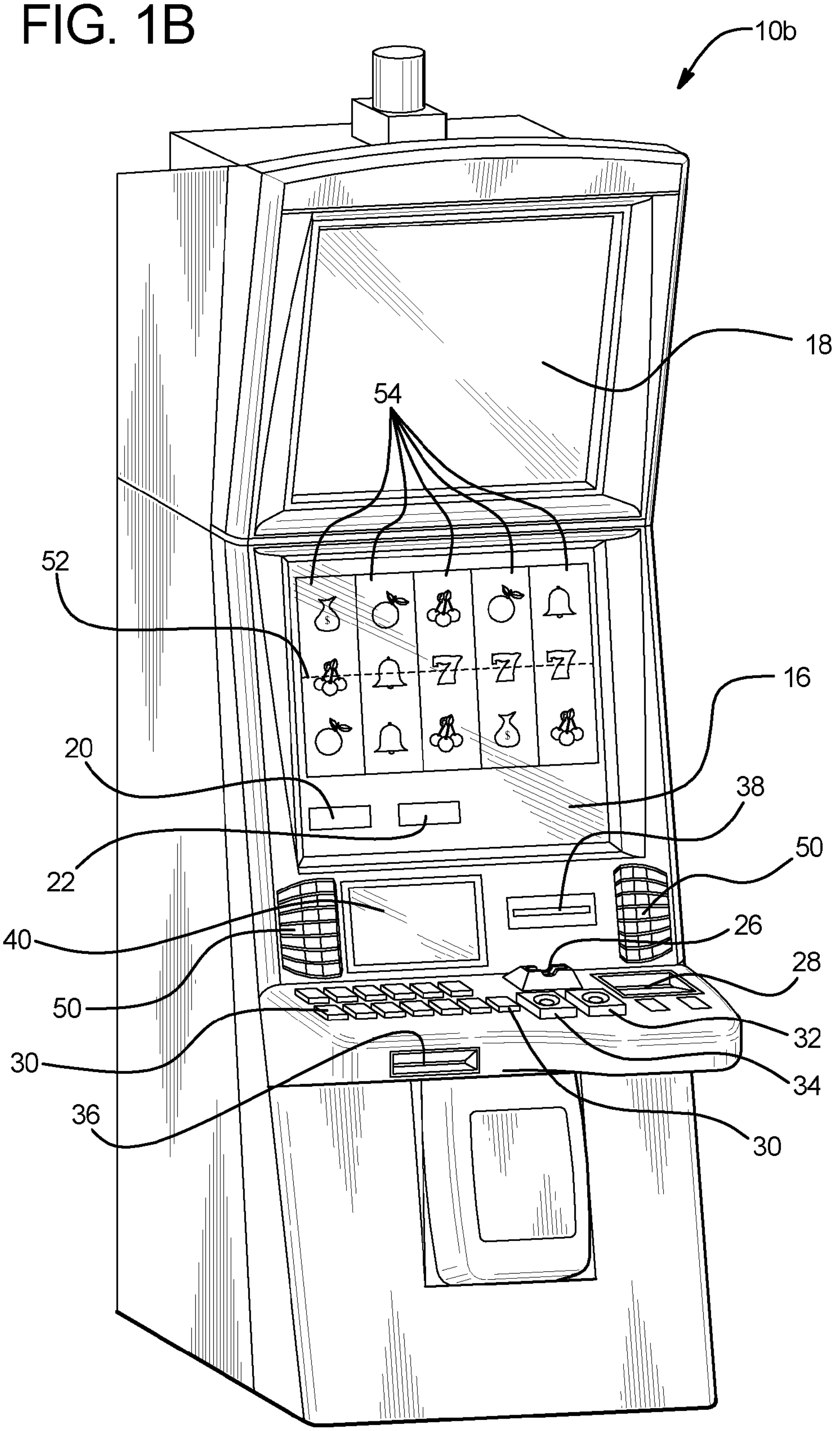

Referring now to the drawings, two example alternative embodiments of the gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
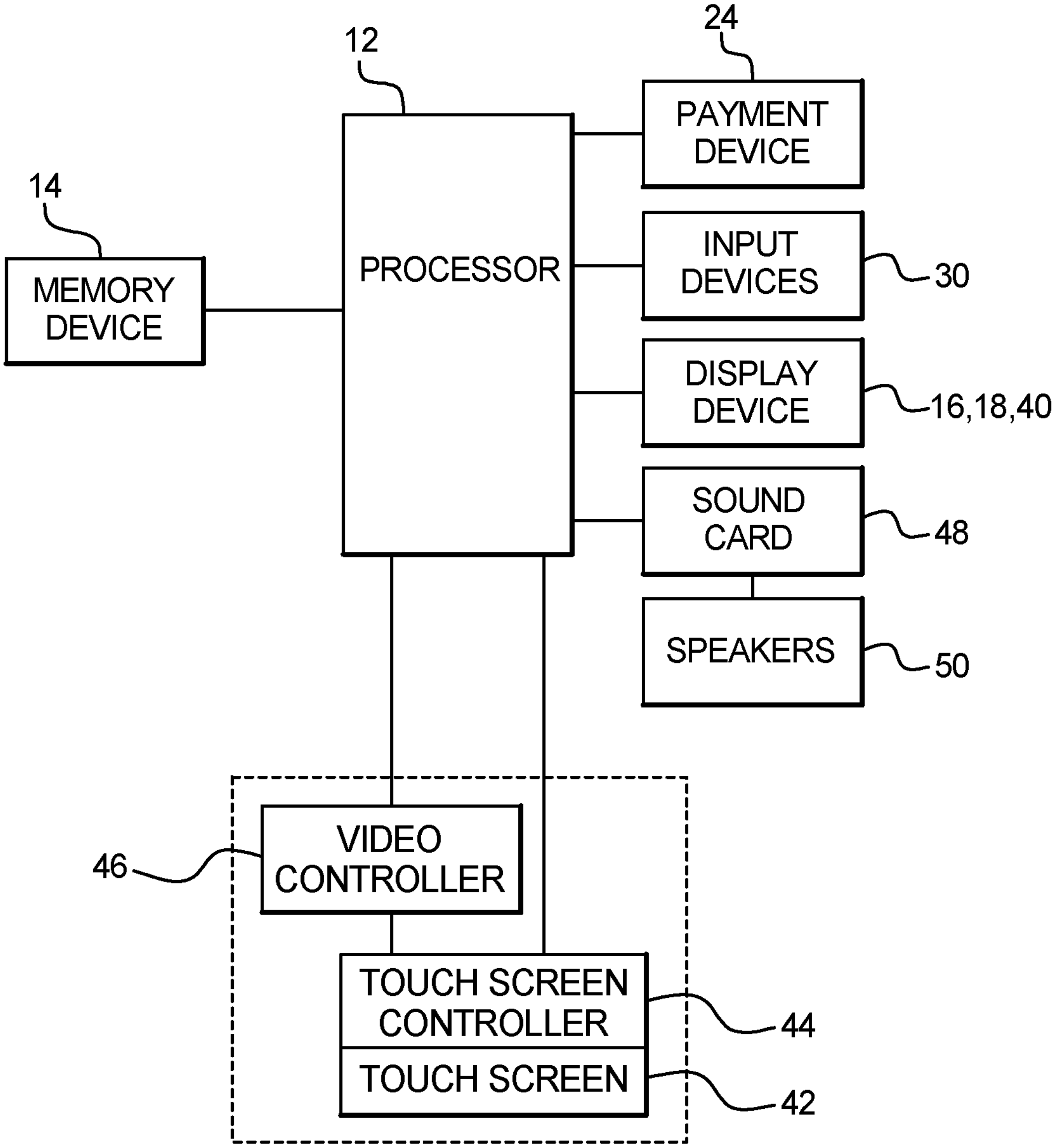
FIG. 2A is a schematic block diagram of one embodiment of an electronic configuration for one of the gaming devices disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM), which can include non-volatile RAM (NVRAM), magnetic RAM (MRAM), ferroelectric RAM (FeRAM) and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD or USB memory device. In other embodiments, part or all of the program code and/or operating data described above can be downloaded to the memory device through a suitable network.

In one embodiment, an operator or a player can use such a removable memory device in a desktop computer, a laptop personal computer, a personal digital assistant (PDA), portable computing device, or other computerized platform to implement the present disclosure. In one embodiment, the gaming device or gaming machine disclosed herein is operable over a wireless network, such as part of a wireless gaming system. In this embodiment, the gaming machine may be a hand held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance or the equivalent. In one embodiment, the gaming device includes a bet display 22 which displays a player's amount wagered. In one embodiment, as described in more detail below, the gaming device includes a player tracking display 40 which displays information regarding a player's playing tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, and the like.

In one alternative embodiment, the symbols, images and indicia displayed on or of the display device may be in mechanical form. The display device may include any electromechanical device, such as one or more mechanical objects, such as one or more rotatable wheels, reels or dice, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data) and other relevant information. In another embodiment, a player may carry a portable device, such as a cell phone, a radio frequency identification tag or any other suitable wireless device, which communicates a player's identification, credit totals (or related data) and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card may be implemented in accordance with the gaming device disclosed herein.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching the touch-screen at the appropriate places. One such input device is a conventional touch-screen button panel.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering primary game. The gaming machine or device may include some or all of the features of conventional gaming machines or devices. The primary game may comprise any suitable reel-type game, card game, cascading or falling symbol game, number game or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, display the plurality of simulated video reels 54. Each reel 54 displays a plurality of indicia or symbols, such as bells, hearts, fruits, numbers, letters, bars or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device with wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels, modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more or each of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one or a plurality of the selectable indicia or numbers via an input device such as the touch screen. The gaming device then displays a series of drawn numbers to determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game. In one embodiment, the bonus or secondary game may be any type of suitable game, either similar to or completely different from the base or primary game.

In one embodiment, as described below, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition may be by exceeding a certain amount of game play (such as number of games, number of credits, amount of time), or reaching a specified number of points earned during game play.

In another embodiment, if the player has not enrolled in the bonus event participation program (as described below), the gaming device processor 12 or central server 56 randomly provides the player one or more plays of one or more secondary games. In one such embodiment, the gaming device does not provide any apparent reasons to the player for qualifying to play a secondary game. In this embodiment, qualifying for a secondary game may not be triggered by an event in or based specifically on any of the plays of any primary game. The gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, if the player has not enrolled in the bonus event participation program (as described below), the gaming device includes a program which will automatically begin a secondary game after the player has achieved a triggering event or qualifying condition in the primary game. In another embodiment, after a player has qualified for a secondary game, the player may subsequently enhance his/her secondary game participation through continued play on the primary game. Thus, for each secondary game qualifying event, such as a secondary game symbol, that the player obtains, a given number of secondary game wagering points or credits may be accumulated in a "secondary game meter" programmed to accrue the secondary game wagering credits or entries toward eventual participation in a secondary game. The occurrence of multiple such secondary game qualifying events in the primary game may result in an arithmetic or exponential increase in the number of secondary game wagering credits awarded. In one embodiment, the player may redeem extra secondary game wagering credits during the secondary game to extend play of the secondary game.

In one embodiment, no separate entry fee or buy in for a secondary game need be employed. In this embodiment, a player may not purchase an entry into a secondary game, rather they must win or earn entry through play of the primary game thus, encouraging play of the primary game. In another embodiment, qualification of the secondary game is accomplished through a simple "buy in" by the player, for example, if the player has been unsuccessful at qualifying through other specified activities. In another embodiment, the player must make a separate side-wager on the secondary game or wager a designated amount in the primary game to qualify for the secondary game. In this embodiment, the secondary game triggering event must occur and the side-wager (or designated primary game wager amount) must have been placed to trigger the secondary game.

Figure 2B:
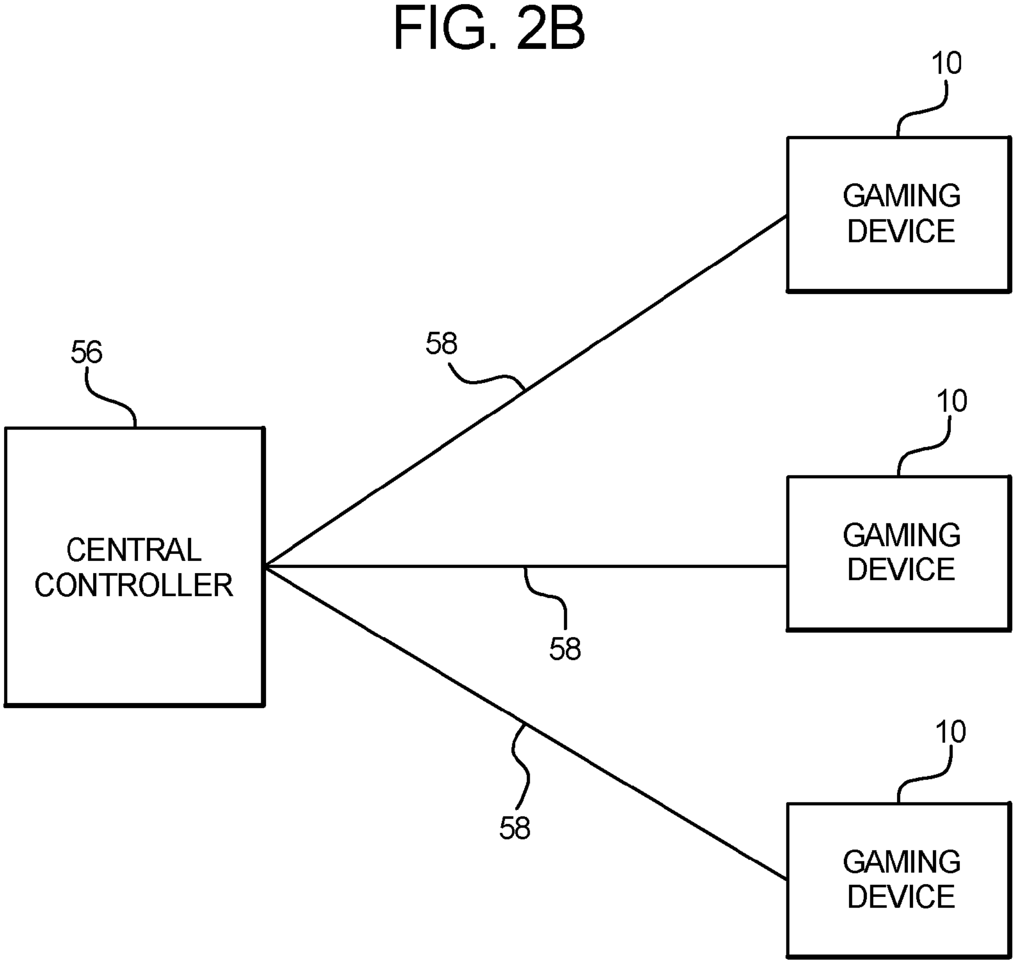
FIG. 2B is a schematic block diagram of one embodiment of a network configuration for a plurality of gaming devices disclosed herein.

In one embodiment, as illustrated in FIG. 2B, one or more of the gaming devices 10 are in communication with each other and/or at least one central server, central controller or remote host 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands or any other suitable data or signal between the individual gaming device and the central server. The gaming device processor is operable to execute such communicated events, messages or commands in conjunction with the operation of the gaming device. Moreover, the processor of the central server is designed to transmit and receive events, messages, commands or any other suitable data or signal between the central server and each of the individual gaming devices. The central server processor is operable to execute such communicated events, messages or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked gaming devices based on the results of a bingo, keno or lottery game. In this embodiment, each individual gaming device utilizes one or more bingo, keno or lottery games to determine the predetermined game outcome value provided to the player for the interactive game played at that gaming device. In one embodiment, the bingo, keno or lottery game is displayed to the player. In another embodiment, the bingo, keno or lottery game is not displayed to the player, but the results of the bingo, keno or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of if the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any players gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts and/or the time these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer, or other internet facilitator is available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Figure 3:
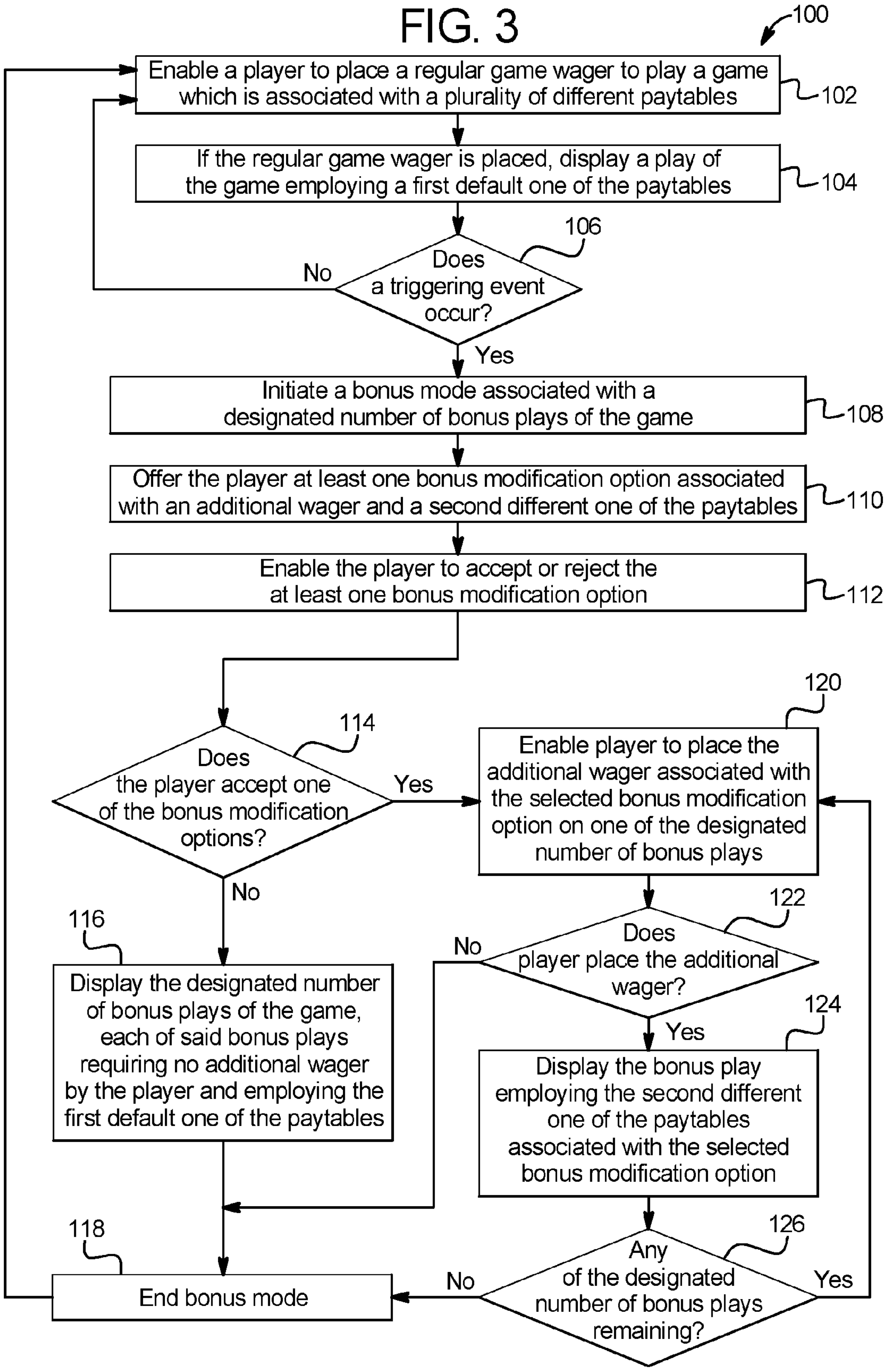
FIG. 3 is a process flow diagram showing one possible flow sequence of one embodiment of the present disclosure.

Referring now to FIG. 3, one embodiment of the present disclosure operates according to sequence 100. This embodiment of the gaming device of the present disclosure includes a game which is associated with a plurality of different paytables. The game initially employs first or default one of the paytables. As indicated by block 102, the gaming device enables a player to place a regular game wager to play the game. If the regular game wager is placed, the gaming device displays a play of the game employing the first default one of the paytables, as indicated by block 104.

As indicated by decision diamond 106, the gaming device determines whether a triggering event occurs. If the gaming device determines that the triggering event does not occur, the gaming device enables the player to place another regular game wager on another play of the game, as indicated by block 102. It should be appreciated that, if the player places the regular game wager to play the game, the game continues to employ the first, default paytable for determining any awards.

If, at decision diamond 106, the determination is made that the triggering event occurs, a bonus mode initiates, as indicated by block 108. It should be appreciated that the bonus mode may be triggered by any suitable designated symbol-driven triggering events or other events based on game play, as well as triggering events that are random and independent of game play, such as a randomized time or set time of day or a separate random determination. In various alternative embodiments, the designated triggering event is based on but not limited to at least one of: (i) an amount of time played on the gaming device; (ii) a random time of the day; (iii) an amount of money wagered on the gaming device; (iv) an amount of money lost at the gaming device; (v) an amount of money won at the gaming device; (vi) an amount of money wagered at games in a gaming device; (vii) an amount of money lost at the gaming devices in a gaming system; (viii) an amount of money won at the gaming devices in a gaming system; (ix) an event or outcome occurring in the game; (x) an event occurring due to a shared random outcome generation; (xi) meeting one or more thresholds, such as a number of plays or a wager pool exceeding a designated amount; (xii) a random determination based on an amount wagered; (xiii) an occurrence of a predetermined event; (xiv) one or more side wagers placed; (xv) a number of consecutive losses; (xvi) a number of consecutive plays without a designated win or win amount; and (xvii) any combination of these.

As indicated by block 110, if the bonus mode is triggered, the gaming device offers the player at least one bonus modification option associated with an additional wager and a designated number of bonus plays of the game employing a second different one of the plurality of paytables. The gaming device enables the player to accept or reject the at least one bonus modification option, as indicated by block 112.

As indicated by decision diamond 114, the gaming device determines whether the player accepts one of the offered bonus modification options. In this embodiment, if the player does not accept one of the bonus modification options, the gaming device displays at least one bonus play of the game without requiring any additional wager by the player, wherein the bonus play employs the first or default one of the paytables, as indicated by block 116. In other embodiments, when the bonus mode is triggered, the player can choose not to accept any one of the offered bonus modification options and forgo the bonus entirely. In such an embodiment, if the player chooses to forgo the bonus, the player can resume placing regular game wagers to play the game employing the first, default paytable.

If, at decision diamond 114, the determination is made that the player accepts one of the bonus modification options, the gaming device enables the player to place the additional wager associated with the selected bonus modification option for a first one of the designated number of bonus plays of the game, as seen in block 120. The gaming device determines whether the additional wager is placed, as indicated by decision diamond 122. If the player places the additional wager, the gaming device displays the first bonus play employing the second different one of the paytables associated with the selected bonus modification option, as indicated by block 124. The gaming device then determines whether there are any bonus plays of the designated number of bonus plays remaining, as indicated by decision diamond 126.

If there are no bonus plays remaining, the bonus mode ends, and the gaming device enables the player to place another regular game wager on another play of the game, as indicated by blocks 118 and 102, respectively. Once the bonus mode ends, the game reverts back to the default paytable. Thus, if the player chooses to place another regular game wager to play the game, the game employs the default paytable, as indicated by block 104.

If, at decision diamond 126, the determination is made that there are bonus plays remaining in the designated number of bonus plays, the gaming device enables the player to place the additional wager associated with the selected bonus modification option on a next one of the bonus plays, as indicated by block 120. The gaming device again determines whether the additional wager is placed, as indicated by decision diamond 122. As long as the player continues to place the additional wager for each of the designated number of bonus plays, the gaming device continues to employ the second different paytable for those bonus plays until there are no bonus plays remaining, at which point the bonus mode ends.

In the illustrated embodiment, if, after the player has accepted a bonus modification option, the player does not place the additional wager on one of the designated number of bonus plays, the gaming device displays that bonus play employing the default paytable (and not the second different paytable), as indicated by block 116. In one such embodiment, the gaming device does not enable the player to continue through any remaining bonus plays of the designated number of bonus plays. In an alternative embodiment, at any point during the bonus mode after the player has accepted a bonus modification option, if the player does not place the required additional wager, the bonus mode automatically ends. That is, once the player accepts the bonus modification option, the player's failure to make the additional wager on any one of the bonus plays of the bonus mode causes the gaming device to end or cancel the bonus mode.

Accordingly, as illustrated in FIG. 3, one embodiment of the present disclosure provides a bonus mode wherein the gaming device offers the player a new, different paytable for a designated number of future bonus plays of a game. To obtain the new paytable, the player must agree or commit to make an additional wager on each of the designated number of future bonus plays. It should be appreciated that, in various alternative embodiments, the number of future bonus plays of the game to which the adjusted paytable will apply is player-defined, operator-defined, predetermined, randomly determined, determined based on time, determined based on wager level, determined based on player tracking, determined based on player status, or determined in any other suitable manner.

When a player opts to replace the default paytable with a new, different paytable, this gives the player one or more advantages. In various embodiments, the new paytable is advantageous or better than the default paytable in one or more ways and to different extents. For example, the new paytable may provide one or more benefits over the default paytable including: (i) a higher average expected payback; (ii) higher awards; (iii) higher awards for designated combinations; (iv) higher probabilities of designated symbols or winning symbol combination occurring; (v) higher multipliers; (vi) random multipliers; (vii) more winning symbol combinations; (viii) a different number of symbols; (ix) different types of symbols; (x) different proportion and/or ordering of symbols; (xi) different types of winning symbol combinations; (xii) extra wild symbols; (xiii) extra bonus-triggering symbols; (xiv) any other feature that provides the player with an advantage; and (xv) any combination of these.

Referring now to FIGS. 5A, 5B, 5C, 5D, 5E, 5F, 5G, and 5H one example embodiment of the gaming device of the present disclosure is shown. In this example embodiment, when the bonus mode is triggered, the gaming device provides a plurality of bonus options which apply to a predetermined number of future plays of a game provided in the bonus mode.

In one embodiment, the game is associated with a plurality of different paytables including a default paytable and at least one second different paytable. Each of the plurality of paytables has an average expected payback. In different embodiments, each or a plurality of the paytables has a different average expected payback.

FIGS. 4A and 4B illustrate portions of two example paytables 200*a* and 200*b*. The paytable 200*a* illustrated in FIG. 4A has an average expected payback of 90%. The paytable 200*b* illustrated in FIG. 4B has an average expected payback of 180%. The winning symbol combinations of a paytable, their respective awards, the chance of the winning symbol combinations occurring (not shown), the losing symbol combinations (not shown), and the chance of the losing symbol combinations occurring (not shown) determine the average expected payback for that paytable. It should be appreciated that for illustration purposes, FIGS. 4A and 4B display a sampling of the different winning symbol combinations in each of the paytables 200*a* and 200*b* and the awards associated with those winning symbol combinations. However, the paytables 200*a* and 200*b* do not display the probability of occurring associated with each winning symbol combination. It should also be appreciated that the illustrated paytables 200*a* and 200*b* do not show losing or non-winning outcomes or other potential winning outcomes.

In the illustrated embodiment, the game initially employs the paytable 200*a* of FIG. 4A as the default paytable. The paytable that is employed in the game is displayed to the player or is displayed to the player upon request.

Figure 5A:
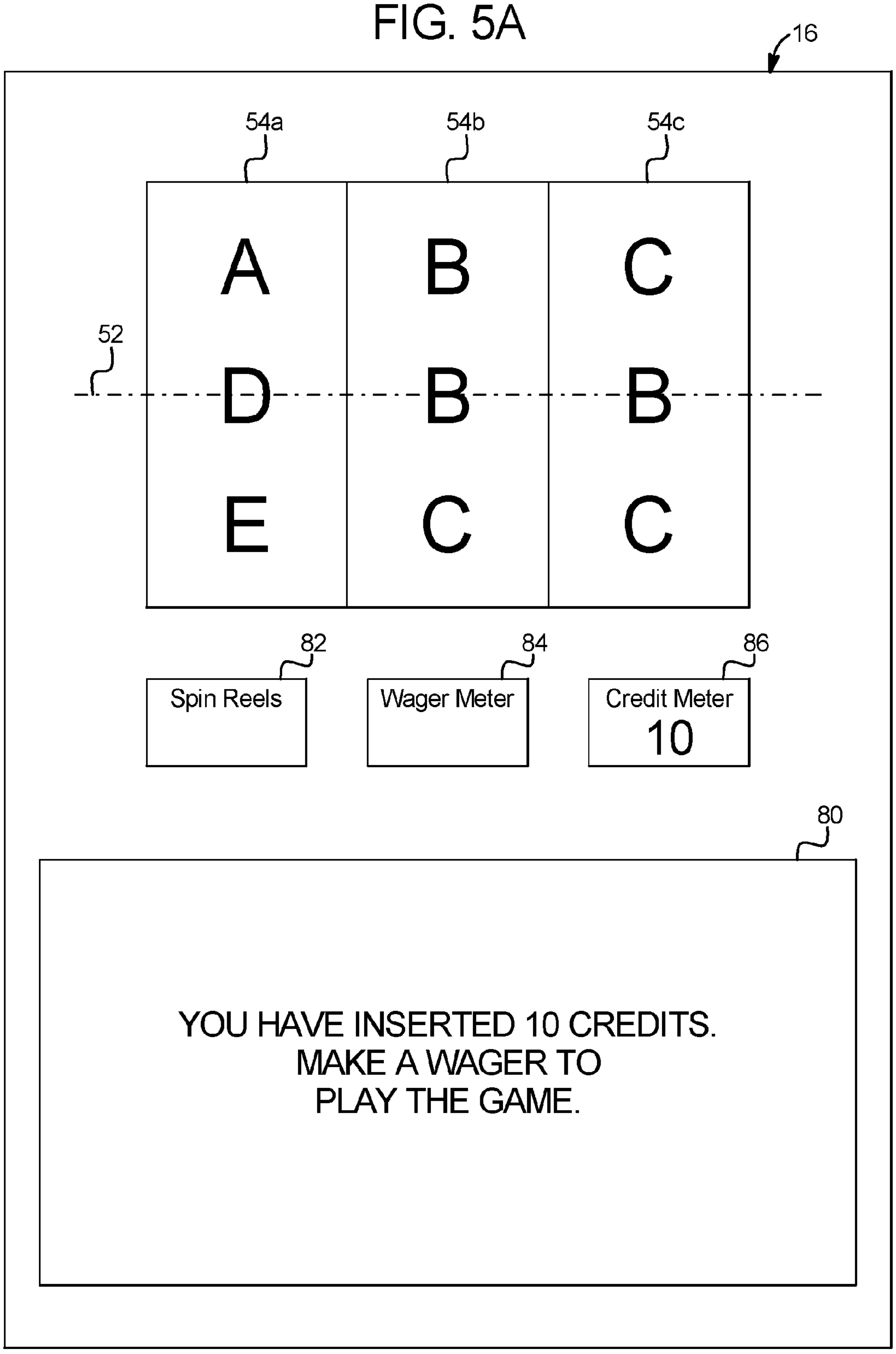
FIGS. 5A, 5B, 5C, 5D, 5E, 5F, 5G, and 5H illustrate screen shots of one example embodiment of the gaming device disclosed herein.

As seen in FIG. 5A, the gaming device of this example embodiment includes a display device 16 having three reels 54*a*, 54*b*, and 54*c* that are associated with one payline 52. The payline 52 is shown in phantom for illustration purposes. The display device 16 further includes a "spin reels" button 82, a credit meter 86, and a wager meter 84. The display device 16 further includes a message display 80 for providing information regarding game play.

Upon sitting down at the gaming device, a player inserts funds into the gaming device. In FIG. 5A, the credit meter 86 shows the number ten, indicating that the player has deposited an amount of funds equivalent to ten credits into the gaming device. The wager meter 84 is currently blank since the player has not yet placed a wager on a play of the game. The gaming device prompts the player to make a wager to play the game, as indicated by message display 80.

Figure 5B:
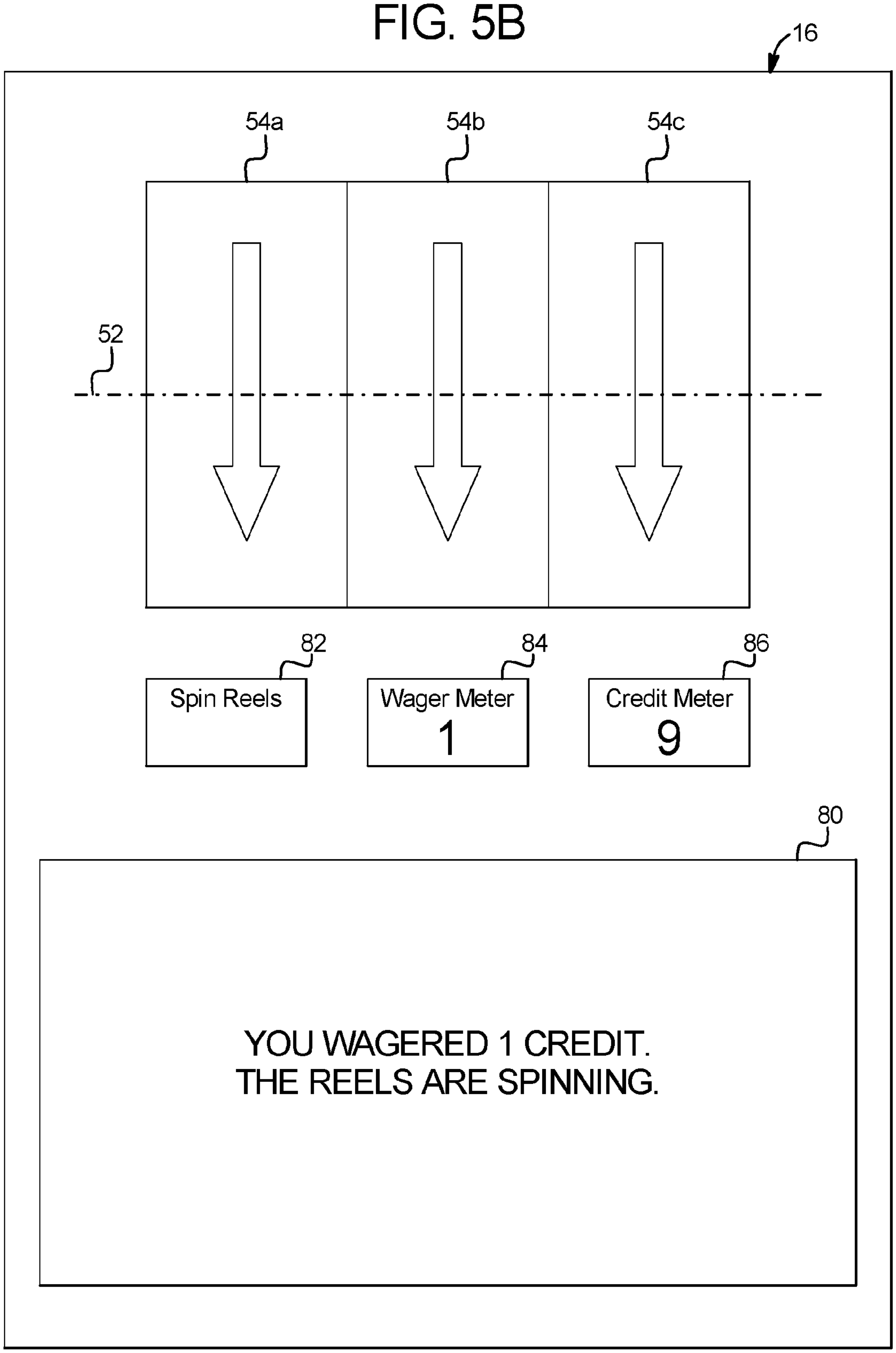
Figure 5C:
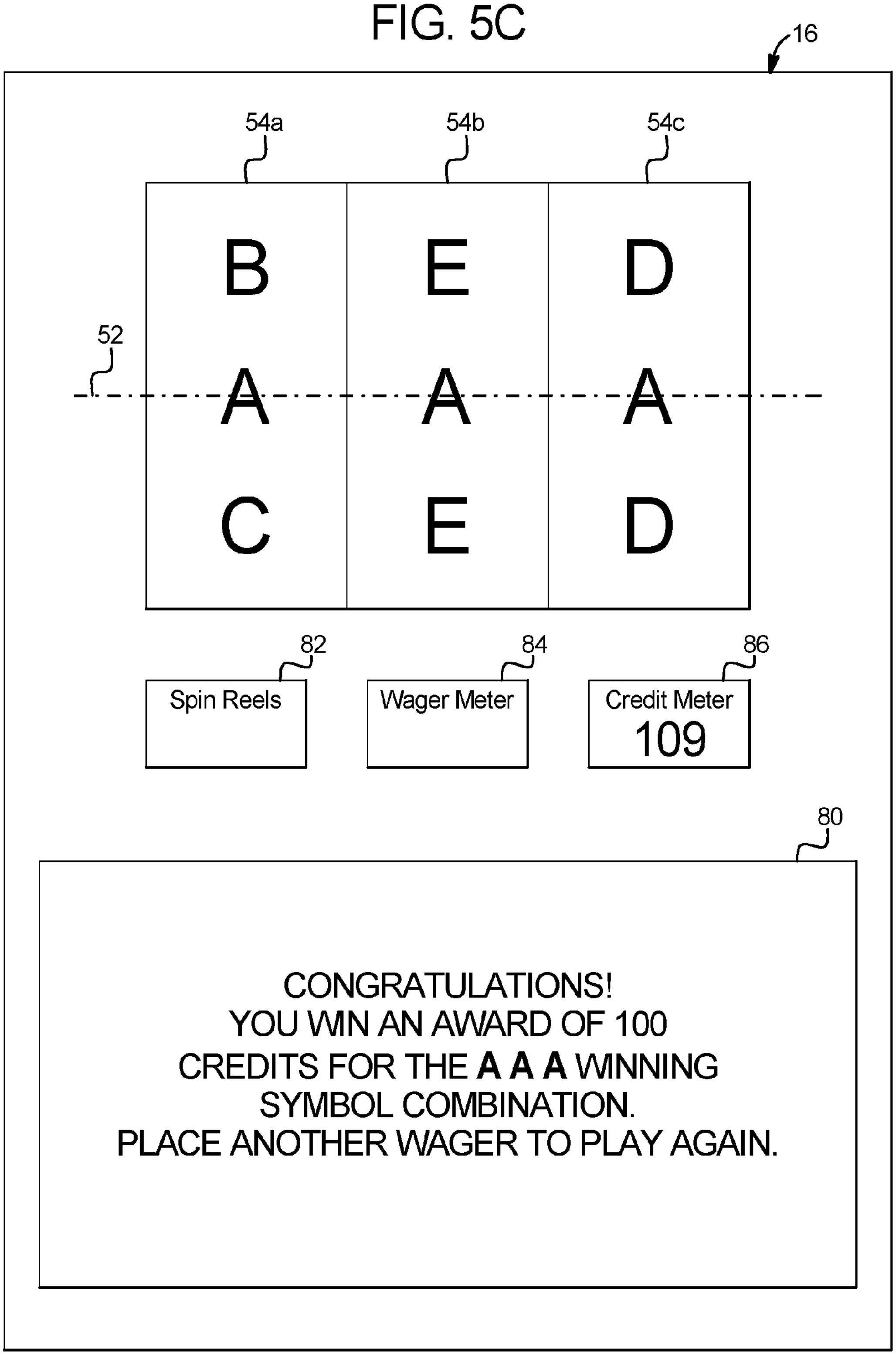

As seen in FIG. 5B, the player places a wager of one credit on a first play of the game and causes the reels 54*a*, 54*b*, and 54*c* to spin for the first time, such as by pushing the spin reels button 82. The credit meter 86 shows the number nine, which reflects that the player used one credit to a make the wager on the first play of the game. As seen in FIG. 5C, as a result of the first spin, three "A" symbols are indicated along the payline. This symbol combination is associated with an award of one hundred credits according to the default paytable 200*a*. The credit meter 86 is therefore updated to reflect that the player has won one hundred credits. That is, the credit meter 86 now shows the number one hundred nine (i.e., 109). The gaming device prompts the player to make another wager on a next play of the game, as indicated by the message display 80.

Figure 5D:
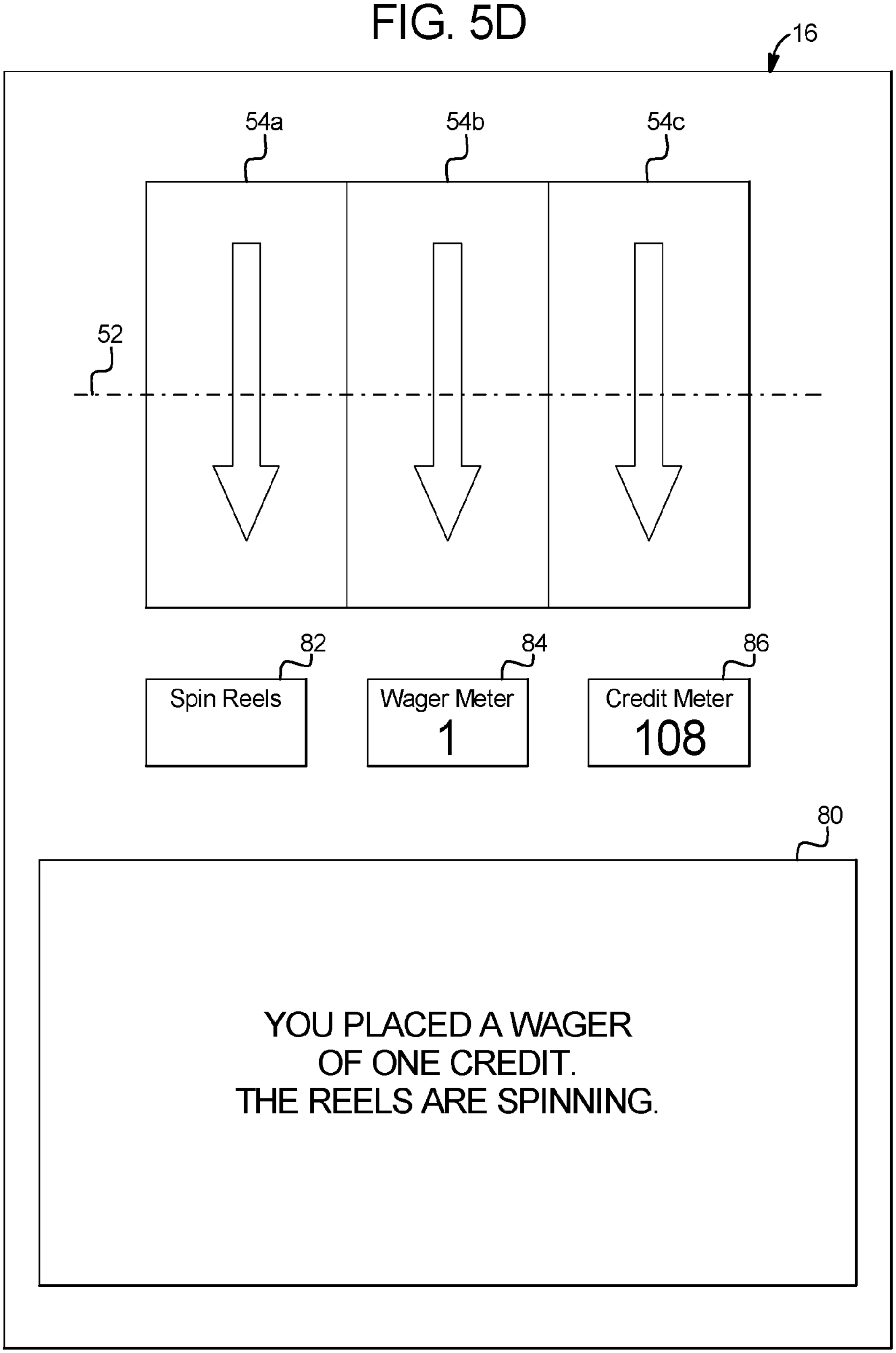
Figure 5E:
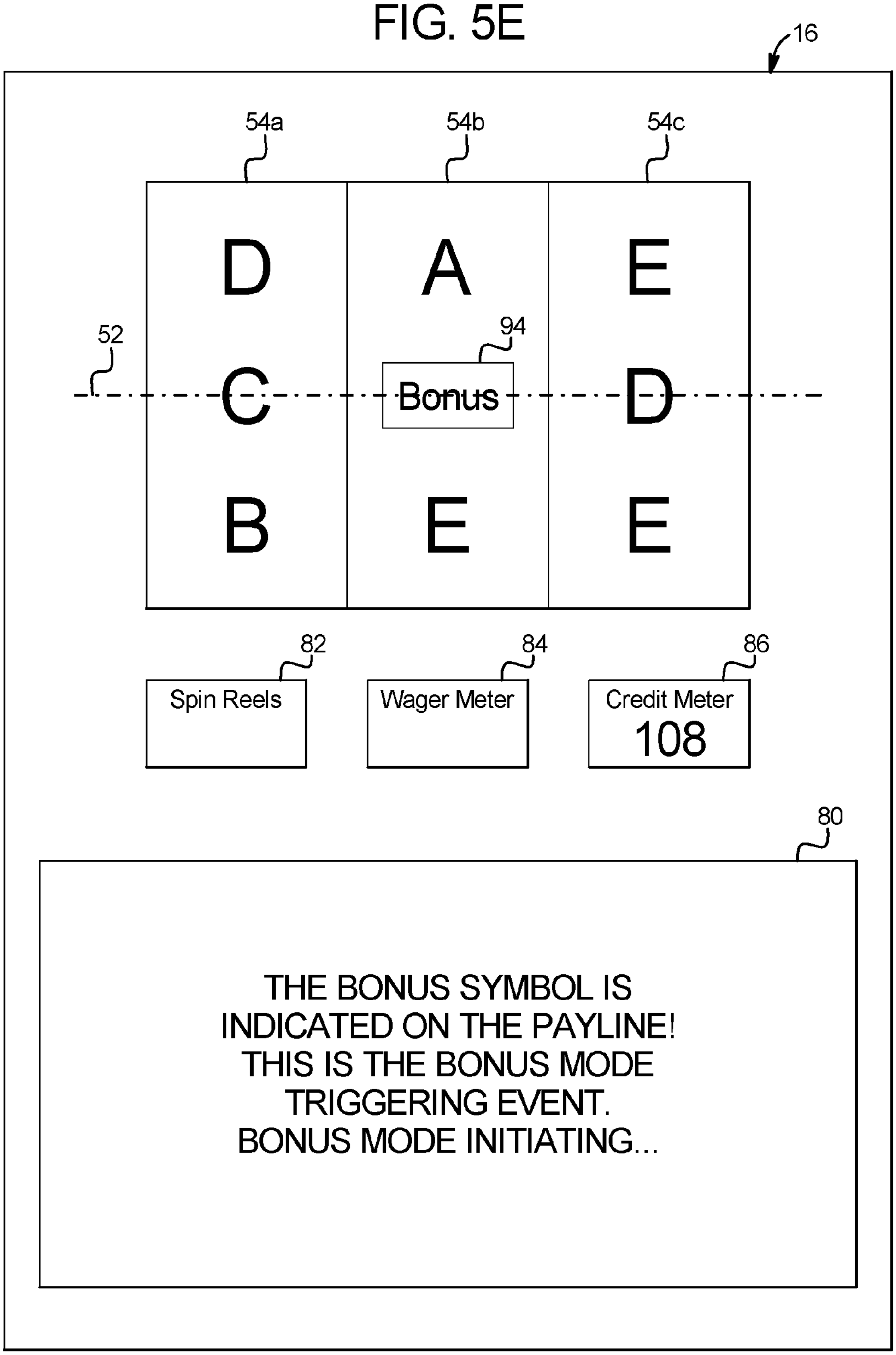

In FIG. 5D, the player places another wager of one credit on a second play of the game and causes the reels 54*a*, 54*b*, and 54*c* to spin for the second time. The credit meter 86 shows the number one hundred eight (i.e., 108), which reflects that the player used one credit for the wager on this second spin. As seen in FIG. 5E, as a result of the second spin, a BONUS symbol 94 is indicated on the payline 52. This is the triggering event that triggers the bonus mode. The gaming device displays a message, as indicated by the message display 80, which indicates to the player that the bonus mode is initiating.

Figure 5F:
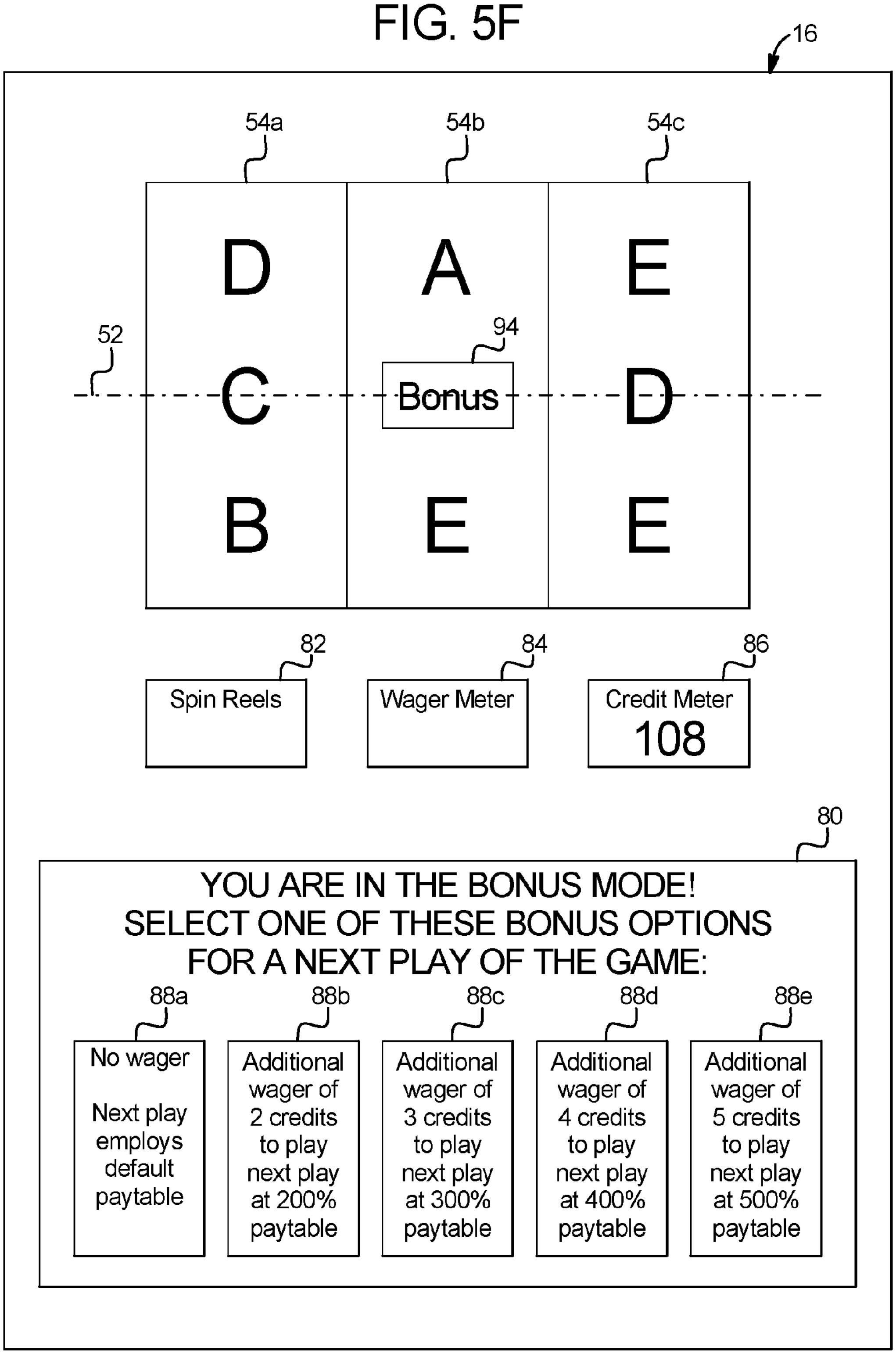

As illustrated in FIG. 5F, the player is in the bonus mode, as indicated by the message display 80. The gaming device displays a plurality of different bonus options 88*a*, 88*b*, 88*c*, 88*d* and 88*e* which will apply to a next play of the game. The gaming device prompts the player to select one of the bonus options 88*a*, 88*b*, 88*c*, 88*d* and 88*e*. Each of the bonus options 88*a*, 88*b*, 88*c*, 88*d* and 88*e* is associated with a respective additional wager amount and a respective one of a plurality of different paytables associated with the game. More specifically, the displayed bonus options include: (a) a first option 88*a* to make no additional wager to play the next play of the game employing the default paytable; (b) a second option 88*b* to make an additional wager of two credits on the next play of the game employing a second paytable having an average expected payback that is two times the average expected payback of the default paytable (i.e., a 200% paytable); (c) a third option 88*c* to make an additional wager of three credits on the next play of the game employing a third paytable having an average expected payback that is three times the average expected payback of the default paytable (i.e., a 300% paytable); (d) a fourth option 88*d* to make an additional wager of four credits on the next play of the game employing a fourth paytable having an average expected payback that is four times the average expected payback of the default paytable (i.e., a 400% paytable); and (e) a fifth option 88*e* to make an additional wager of five credits on the next play of the game employing a fifth paytable having an average expected payback that is five times the average expected payback of the default paytable (i.e., a 500% paytable).

In other embodiments, when the bonus mode is triggered, the gaming device offers the player one or more bonus options for increasing the current average expected payback of the game by a certain amount or increment for a designated number of future plays of the game. For example, the player can commit to making a first wager on each of the designated number of plays to elevate the current average expected payback of the game by 2% for each of those plays; or the player can commit to making a second higher wager on each of the designated number of plays to elevate the current average expected payback of the game by 3% for each of those plays. In certain such embodiments, the gaming device does not display the actual average expected paybacks associated with each of the different bonus options. Rather, the gaming device displays the respective amounts by which the player can elevate the current average expected payback of the game.

In other embodiments, rather than or in addition to offering the player one or more different, better paytables for a number of future plays of the game, the gaming device offers to adjust the reel strips in one or more ways for those future plays of the game. For example, the reel strips can be adjusted to include more symbols that give the player an advantage in the game, such as more symbols of a certain type, more symbols having a higher value, more wild symbols, more locking wild symbols, more bonus-triggering symbols, etc. In another embodiment, when the bonus mode is triggered, the gaming device offers the player a number of free activations of the game employing a better paytable.

Figure 5G:
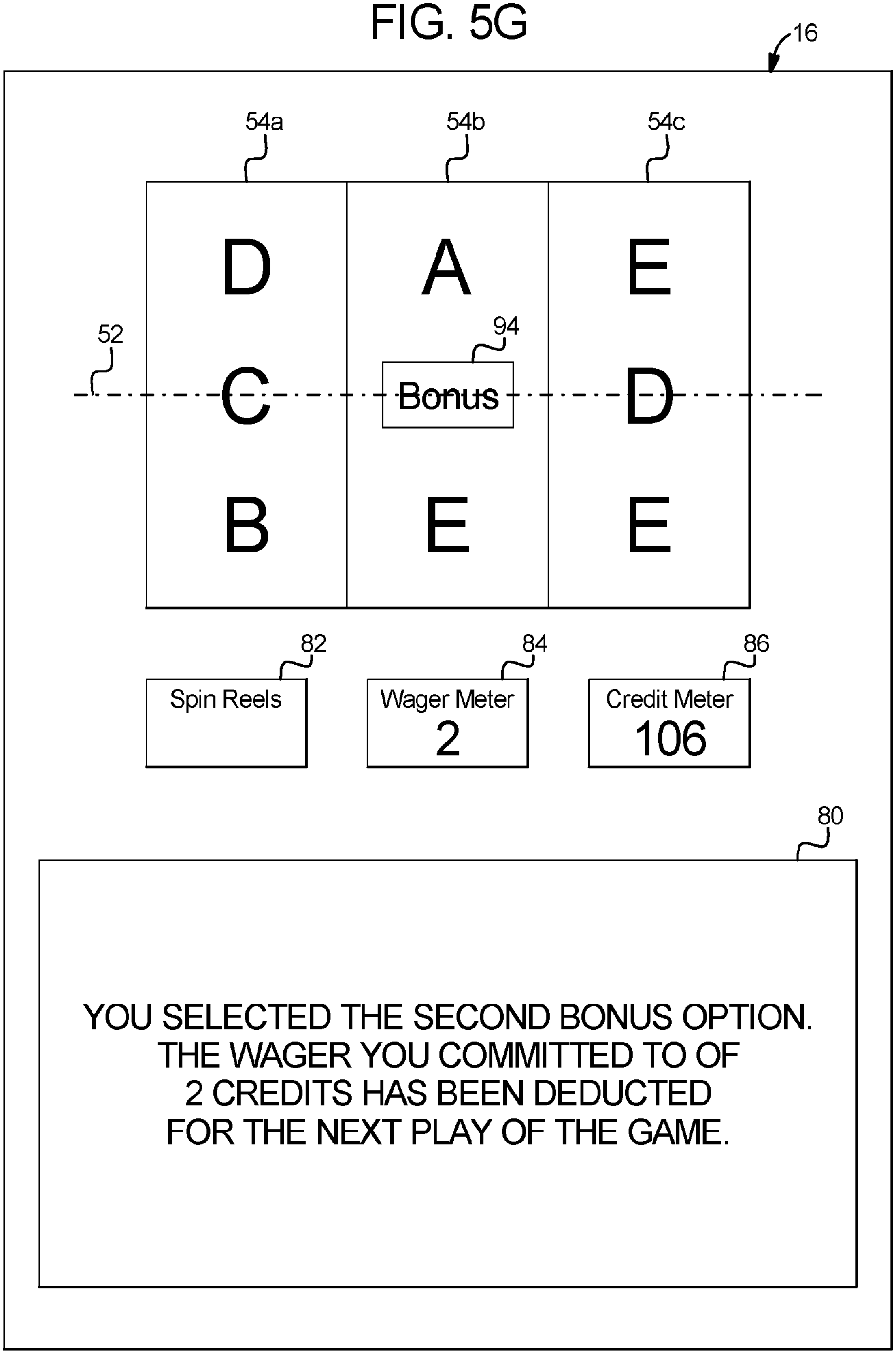

As seen in FIG. 5G, the player chooses the second bonus option 88*b*, as indicated by the message display 80. Accordingly, the additional wager amount of two credits associated with the second bonus option is deducted from the credit meter 86. The credit meter 86 is updated to show the number one hundred six (i.e., 106). For the next play of the game, the gaming device will employ the 200% paytable, which has an average expected payback that is two times the average expected payback of the default paytable (i.e., 180%). In this example, the 200% paytable is the paytable 200*b* illustrated in FIG. 4B.

Figure 5H:
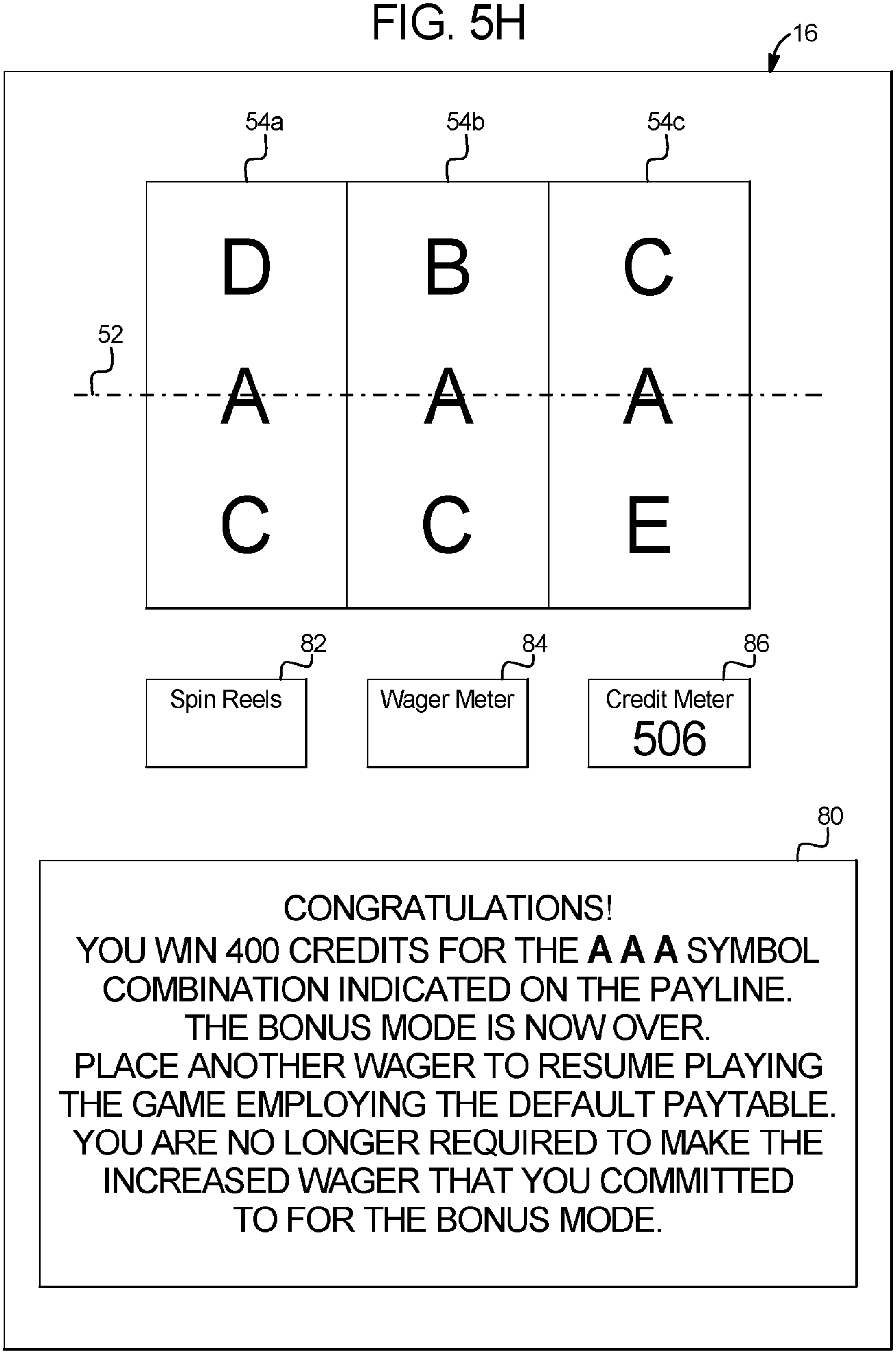

As seen in FIG. 5H, the reels 54*a*, 54*b*, and 54*c* have spun and, as a result of the spin, three A symbols are indicated on the payline 52. The award associated with this winning symbol combination is 200 credits, according to the paytable 200*b*. The gaming device therefore provides a total award of 400 credits for this spin (i.e., 200 credits for the wining symbol combination, multiplied by the required additional wager of 2 credits). The credit meter 86 reflects that the player now has a total of five hundred six (i.e., 506) credits. After the play of the game employing the 200% paytable is complete, the gaming device informs the player that the bonus mode is over. At this point, the game reverts back to the default paytable, paytable 200*a*. The player is no longer required to make the increased or additional wager that the player previously committed to upon accepting the second bonus option 88*b*.

As illustrated by the example of FIGS. 5A to 5H, by committing to make the additional wager, the player gained the opportunity to play the game employing a paytable having an average expected payback that is two times the average expected payback of the default paytable. As a result, the player won a very large award in the bonus mode.

In one embodiment, the relationship between the amount of the additional wager and the adjustment to the average expected payback is linear. For instance, as seen in the example of FIGS. 5A to 5H, the player obtained a paytable having an average expected payback that was two times the average expected payback of the default paytable for placing an additional wager that was two times the player's regular game bet. In other embodiments, the relationship between the amount of the additional wager and adjustment to the average expected payback is non-linear. For example, if a player commits to placing an additional wager that is two times the player's regular game bet, the gaming device replaces the default paytable with an average expected payback of 90% with a paytable that has an average expected payback of 120% or 150%.

In certain embodiments, when the player chooses to replace the default paytable with a new, different paytable, the new paytable has an average expected payback that falls within a range that is acceptable to the casino. For example, the default paytable may be associated with an average expected payback of 90%, and the new paytable has an average expected payback of 92.5%.

In various embodiments, the funding of the awards won during the bonus plays of the bonus mode is based upon the additional wager placed by the player on the bonus plays during the bonus mode.

In one embodiment, the amount of the additional wager is determined based at least in part on the player's play or betting history. In such an embodiment, the gaming device monitors the player's wagers in the regular game for a designated time period, such as thirty minutes, one hour, or one day. In one such embodiment, when the bonus mode is triggered, the gaming device offers the player a new, better paytable for a number of future plays of the game if the player commits to making, for each of those future plays of the game, an additional wager of an amount that is equal to the player's average wager in the monitored time period. The player must continue making this specific additional wager for each play during the bonus mode to continue receiving the benefit of the new paytable. This locks the player in to making a specific wager for a number of future plays of the game. It also prevents the player from drastically increasing the wager under circumstances where the player knows the game is employing an enhanced paytable.

In certain embodiments, the additional wager required to obtain the benefit of a new, better paytable during the bonus mode is a wager amount that the player cannot ordinarily bet on the regular game. For example, a player is betting a maximum bet of $1.00 on each play of a game employing a default paytable having a 90% average expected payback. When the bonus mode is triggered, the gaming device offers the player a paytable having a 180% average expected payback for the next two plays of the game, if the player agrees to place an additional wager of $2.00 on each of those plays. Thus, for the next two plays of the game, the gaming device enables the player to place a wager that cannot ordinarily be placed in the regular game (i.e., a wager that exceeds the maximum bet). Moreover, for these plays, the game employs a paytable having an average expected payback that is two times the average expected payback of the default paytable. This gives the player the opportunity to win very large awards during the bonus mode. It should be appreciated, however, that the player must continue placing the additional wager for all plays during the bonus mode, or the bonus mode will be cancelled. If the player cancels the bonus mode, the player can resume playing the game employing the default paytable, but the player must adjust the wager so that it is of an amount that is equal to or lower the maximum bet.

In one embodiment, the player must wager the maximum bet on the regular game to be eligible to obtain a new paytable when the bonus mode is triggered. In another embodiment, the player is not required to place the maximum bet on the regular game to be eligible to obtain a new paytable in the bonus mode.

Figure 6A:
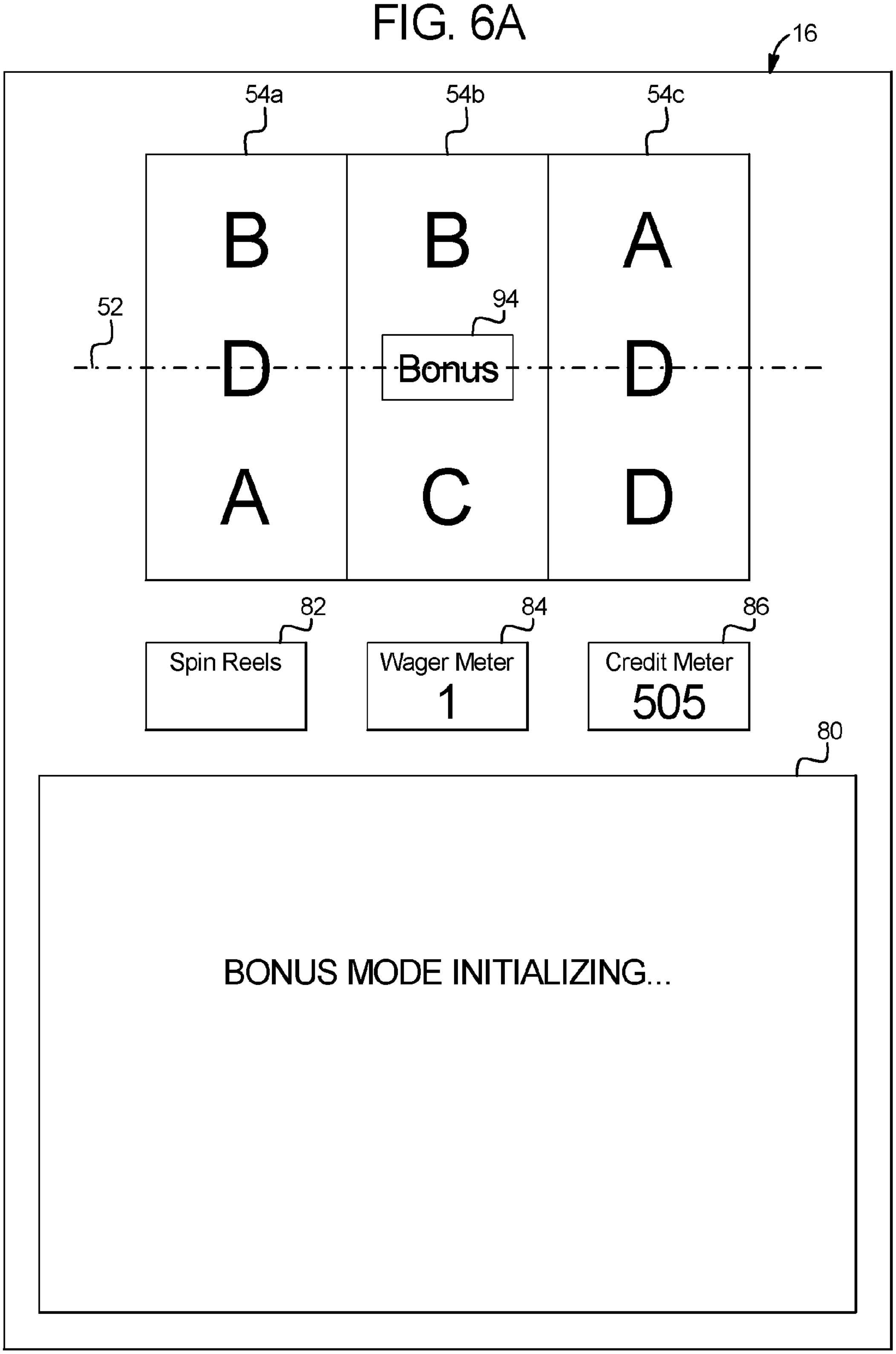
FIGS. 6A, 6B, 6C, and 6D illustrate screen shots of another example embodiment of the gaming device disclosed herein.
Figure 6B:
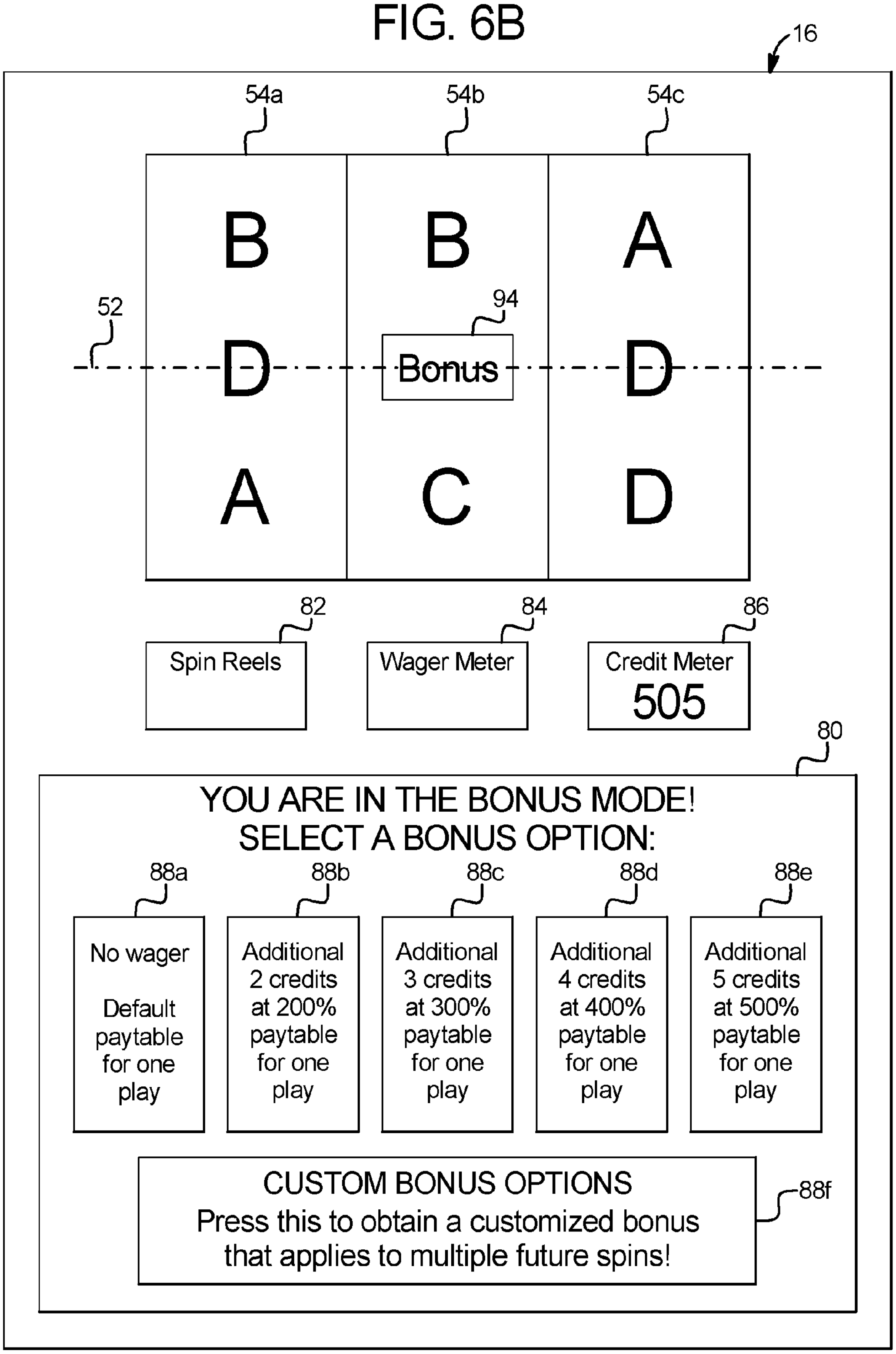

Referring now to FIGS. 6A and 6B, another example embodiment of the gaming device of the present disclosure is shown. In this example embodiment, when the bonus mode is triggered, the gaming device provides a plurality of bonus options, which includes at least one custom bonus option, for a number of future plays of a game.

For ease of illustration, in FIGS. 6A and 6B, the same player playing at the gaming device of FIGS. 5A to 5H is continuing his gaming session. As seen in FIG. 6A, the player has wagered one credit on a spin of the reels 54*a*, 54*b*, and 54*c*, as indicated by the wager meter 84. As a result of this spin, the bonus symbol 94 is indicated on the payline 52. This causes the bonus mode to initiate, as indicated by the message display 80.

As seen in FIG. 6B, once the bonus mode has initiated, the gaming device displays a plurality of bonus options 88*a*, 88*b*, 88*c*, 88*d*, 88*e*, and 88*f* to the player and prompts the player to select one of the bonus options 88*a*, 88*b*, 88*c*, 88*d*, 88*e*, and 88*f*, as indicated by the message display 80. More specifically, the gaming device displays six possible bonus options, including: (i) a first bonus option 88*a* to place no additional wager and accept the default of one bonus spin employing the default paytable; (ii) a second bonus option 88*b* to place an additional wager of 2 credits on the next spin employing the 200% paytable; (iii) a third bonus option 88*c* to place an additional wager of 3 credits on the next spin employing the 300% paytable; (iv) a fourth bonus option 88*d* to place an additional wager of 4 credits on the next spin employing the 400% paytable; (v) a fifth bonus option 88*e* to place an additional wager of 5 credits on the next spin employing the 500% paytable; and (vi) a sixth bonus option 88*f* which is a "custom" bonus option.

In one embodiment, choosing the custom bonus option enables the player to obtain a specific, customized bonus which applies to multiple future plays of the game. In one embodiment, the customized bonus is operator-defined. In another embodiment, the customized bonus is player-defined. That is, the player can create his or her own customized bonus, as discussed in more detail below. In other embodiments, the gaming device enables the player to choose from a plurality of customized bonuses, which may be player-defined, operator-defined, or both.

Figure 6C:
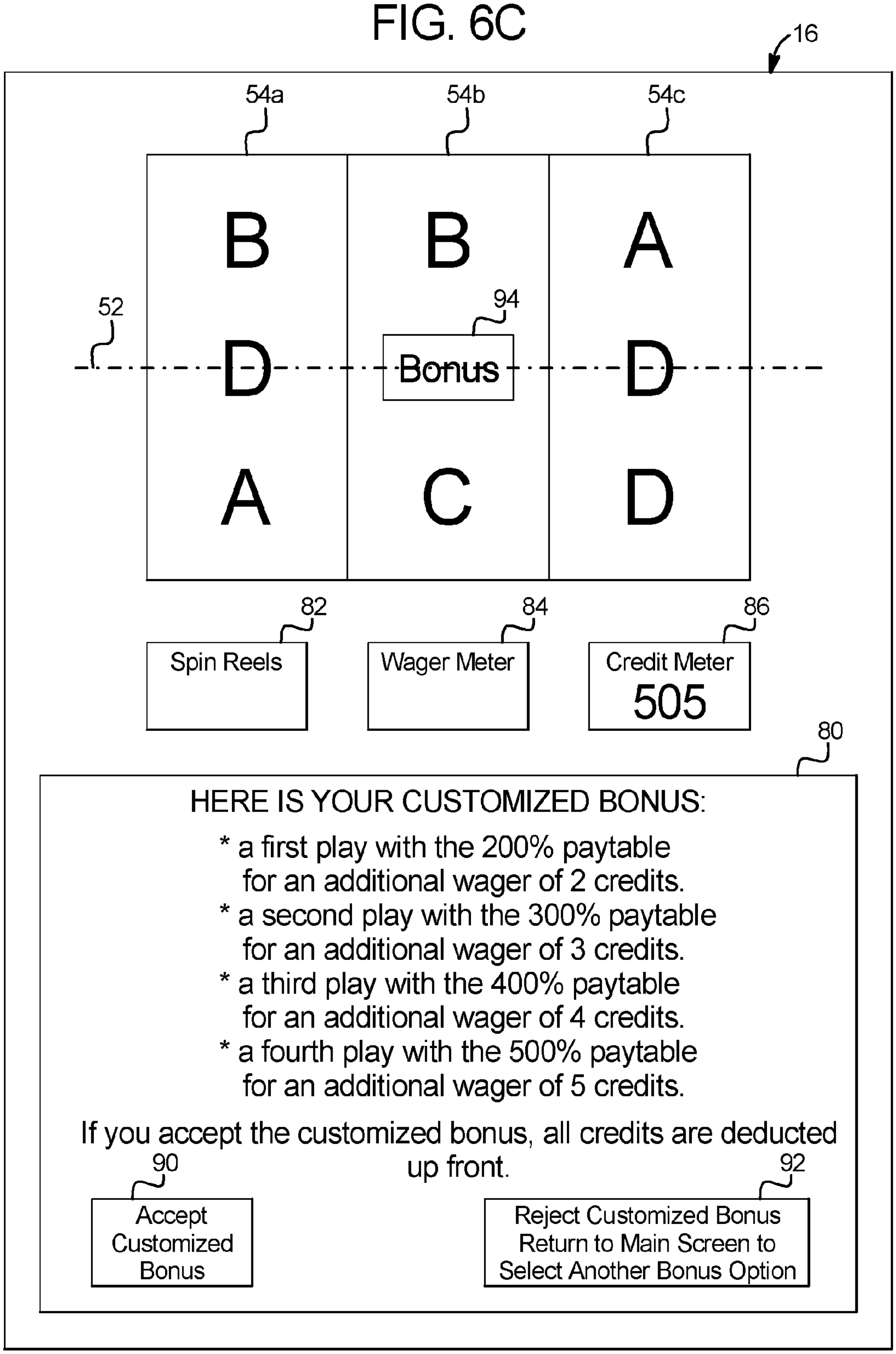

As seen in FIG. 6C, the player has chosen the custom bonus option 88*e*. As indicated by the message display 80, for the customized bonus, the gaming device offers to consecutively employ each of a series of different paytables for a plurality of future plays of the game. More specifically, the customized bonus includes four future plays of the game, wherein the four plays include: (i) a first play of the game employing the 200% paytable for an additional wager of two credits; (ii) a second play of the game employing the 300% paytable for an additional wager of three credits; (iii) a third play of the game employing the 400% paytable for an additional wager of four credits; and (iv) a fourth play of the game employing the 500% paytable for an additional wager of five credits. Thus, the customized bonus offers an escalating paytable for a plurality of future plays of the game. The player can accept the customized bonus that has been offered to the player by activating the accept input 90, or the player can reject the customized bonus by activating the reject input 92. If the player rejects the customized bonus option, the gaming device displays the bonus options 88*a*, 88*b*, 88*c*, 88*d*, 88*e*, and 88*f* and enables the player to make another selection of one of the bonus options.

If the player accepts the customized bonus, the player agrees to make the specified additional wagers for each of the four future plays of the game. The gaming device informs the player that, if the player accepts the customized bonus, all credits for the four plays (i.e., all the additional wager amounts) will be deducted upfront. Thus, in the illustrated embodiment, the gaming device requires the player to place a pre-set additional wager amount of fourteen credits upfront or upon accepting the customized bonus offer. The fourteen credits covers the additional two credits for the first bonus play, the additional three credits for the second bonus play, the additional four credits for the third bonus play, and the additional five credits for the fourth bonus play.

Figure 6D:
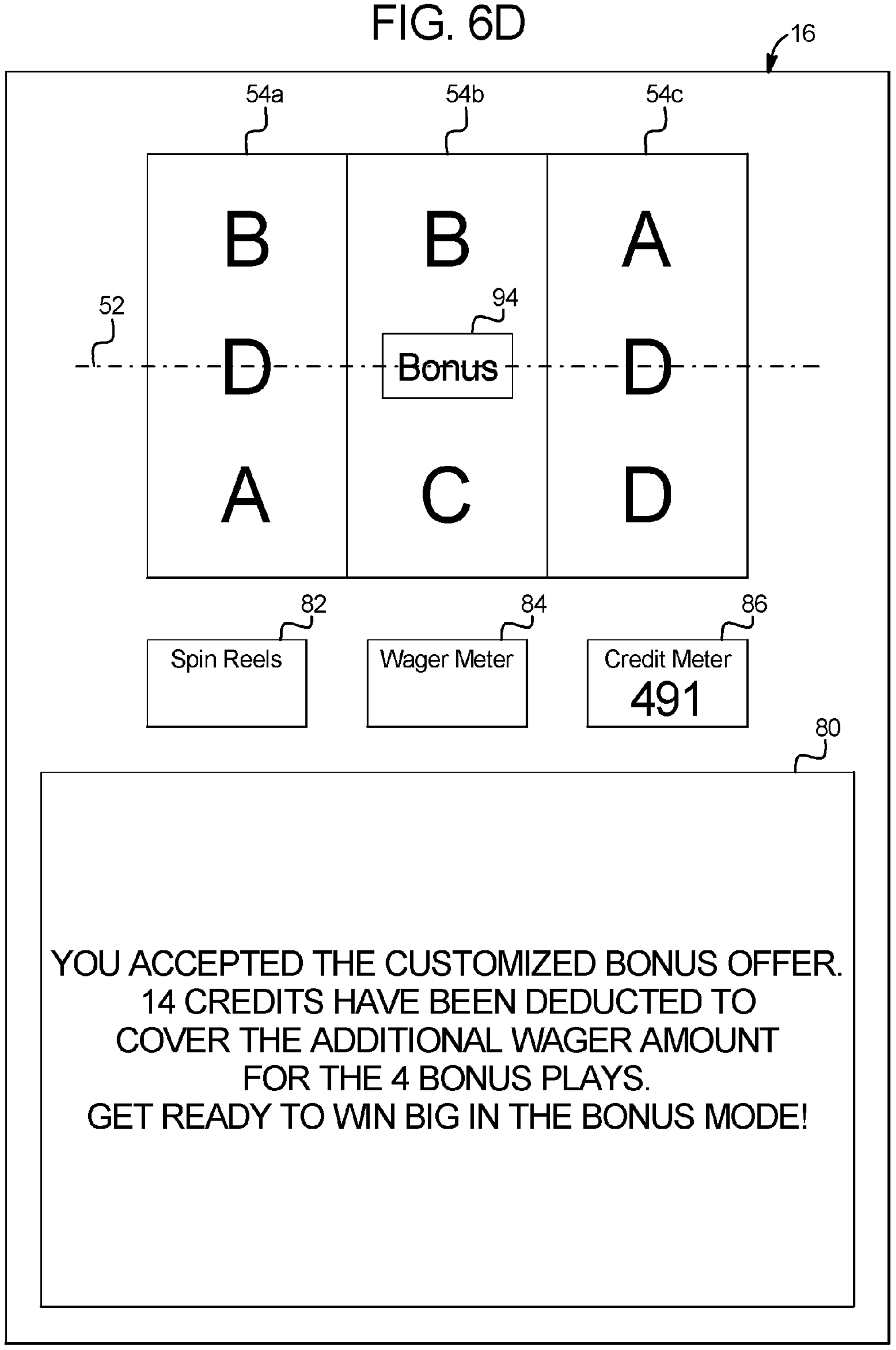

As illustrated in FIG. 6D, the player has chosen to accept the customized bonus. Accordingly, fourteen credits are deducted from the credit meter 86 to cover the additional wagers for the four bonus plays. Therefore, the credit meter 86 shows the number four hundred ninety one (i.e., 491). The four bonus plays are then provided without interruption.

In one embodiment, the gaming device informs the player before the player makes a selection of one of the bonus options that any required additional wagers for the bonus plays will be deducted upfront. In other embodiments, the gaming device does not require the player to pay all of the additional wagers upfront. Rather, the player can place each additional wager amount prior to each bonus play. It should be appreciated however that, in such embodiments, if the player fails to place a required additional wager on one of the bonus plays, the bonus mode is canceled, and the player will not have the chance to continue through any remaining bonus plays.

As illustrated by the example of FIGS. 6A to 6D, the custom bonus option thus provides the player with an opportunity to obtain an escalating paytable as a bonus for making additional wagers on each of a plurality of future plays of the game. As long as the player makes the additional wager on each of those plays, the paytable continues to ramp up during those plays.

It should be appreciated that, in various embodiments, the custom bonus option does not necessarily provide an escalating paytable, but may provide any series of paytables which are employed over multiple future plays of the game. In various embodiments, each or a plurality of the paytables in the series of paytables are different. In other embodiments, each or a plurality of the paytables in the series of paytables are the same.

In one embodiment, selecting the custom bonus option enables the player to create or structure a bonus that applies to a designated number of future plays of the game according to player preference. In such an embodiment, the player has the opportunity to determine or define one or more bonus parameters that dictate how the bonus is structured. That is, the player can determine or define bonus parameters, such as the number of bonus plays, which paytable or paytables will be employed for those bonus plays, and in what order, etc. In one embodiment, the gaming device includes one or more inputs for enabling the player to set or modify the bonus parameters. In various alternative embodiments, one or more of the bonus parameters may be operator-defined, player-defined, determined based on player tracking, based on player status, or any other suitable criteria. In one embodiment, customized bonus offers are created for and provided to certain players based on each player's game play or betting history.

In an alternative embodiment, upon an occurrence the triggering event which triggers the bonus mode, the gaming system offers the player a new, better paytable which lasts for a certain period of time (i.e., a bonus time period), such as ten seconds, one minute, one hour, or one day. In one such embodiment, the player must make an additional wager on each play of the game played during the bonus period to obtain the benefit of the new paytable. In one such embodiment, the player can play the game employing the new paytable as many times as the player likes within the bonus time period. The player obtains the benefit of the better paytable as long as player continues to place the additional wager amount on any plays played during the bonus time period. In one such embodiment, the gaming system displays a countdown timer is to player. When the countdown timer runs out, this indicates to the player that the bonus time period has expired. In one embodiment, the gaming device imposes a maximum limit on the number of plays that can be played during the bonus time period.

In one such embodiment, each time the player plays the game played during the bonus time period, the gaming device adds an amount of time to the countdown timer. The added amount of time is less time than it takes to complete a play of the game. In this manner, the countdown timer will expire at some point, but the player can extend the duration of the bonus mode by playing faster. In other embodiments, time may be added to the countdown timer for losses or wins below a certain threshold during the bonus time period. In this manner, if a player is not winning or is not winning awards of a sufficient size during the bonus time period, the gaming device can extend the bonus time period and thus enable a player to play in the bonus mode longer.

In one embodiment, when the bonus mode is triggered, the player has a limited amount of time to decide whether or not they want to place an increased or additional wager on a next play of the game to play the game with an enhanced paytable. In one embodiment, once the bonus mode initiates but prior to a bonus play, a countdown timer is set, such as to ten seconds, and the player must decide within the ten seconds whether to place the additional wager on the bonus play. If the player decides to place the additional wager before the countdown timer expires, the gaming device provides the next play of the game employing the enhanced paytable.

In one such embodiment, the player can extend the bonus mode by continuing to place the additional wager on subsequent plays of the game. The countdown time is reset prior to each play, and the player must decide to place the additional wager before the countdown timer expires. As long as the player continues placing the additional wager within the countdown period, the bonus mode continues. The player cancels the bonus mode by choosing not to place the additional wager and/or allowing the countdown timer expire. When the bonus mode ends or is canceled by the player, the game automatically reverts back to using the default paytable, and the player can adjust the wager to their liking, in accordance with the normal or default wagering options provided to the player by the gaming device.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

at least one input device;

at least one display device;

at least one processor; and at least one memory device which stores a plurality of instructions which, when executed by the at least one processor, cause the at least one processor to operate with the at least one display device and the at least one input device to:

(a) enable a player to place a primary game wager on a play of a primary game, said play of the primary game employing a first paytable;

(b) if said primary game wager is placed, determine and display a primary game outcome;

(c) determine and provide any awards based on the determined primary game outcome in accordance with the first paytable; and (d) upon an occurrence of a designated triggering event:

(i) initiate a bonus mode;

(ii) after the bonus mode is initiated, display a plurality of options associated with a secondary game, including a first default option and at least one second different option, each of said options associated with a respective number of one or more plays of the secondary game, the number of plays of the secondary game associated with the at least one second different option being at least two;

(iii) enable the player to select one of the displayed options;

(iv) if the player selects the first default option, for each of the number of plays of the secondary game associated with the first default option:

(A) determine and display a secondary game outcome without requiring any additional wager by the player, and (B) determine and provide any awards based on the determined secondary game outcome in accordance with a second paytable; and (v) if the player selects the at least one second different option:

(A) for a first one of the plays of the secondary game associated with the at least one second different option:

(1) require the player to place a required first additional wager having a first additional wager amount, (2) determine and display a secondary game outcome, and (3) determine and provide any awards based on the determined secondary game outcome in accordance with a third paytable having a third average expected payback; and (B) for a second subsequent one of the plays of the secondary game associated with the at least one second different option:

(1) require the player to place a required second additional wager, an amount of the required second additional wager being greater than the first additional wager amount;

(2) determine and display a secondary game outcome; and (3) determine and provide any awards based on the determined secondary game outcome in accordance with a fourth paytable having a fourth average expected payback that is greater than the third average expected payback.

2. The gaming system of claim 1, wherein the first and second paytables are the same.

3. The gaming system of claim 2, wherein the second and third paytables are different.

4. The gaming system of claim 3, wherein the third average expected payback is higher than an average expected payback of the second paytable.

5. The gaming system of claim 1, wherein said display of the plurality of options associated with the secondary game includes: (i) an explanation that the first default option does not require any additional wager by the player for each of the number of plays of the secondary game associated with the first default option, and (ii) an explanation that the at least one second different option requires: (a) the required first additional wager by the player for the first one of the plays of the secondary game associated with the at least one second different option, and (b) the required second additional wager by the player for the second subsequent one of the plays of the secondary game associated with the at least one second different option.

6. The gaming system of claim 1, wherein the plurality of options associated with the secondary game includes a plurality of third options, each of said third options associated with a different one of a plurality of third option paytables.

7. The gaming system of claim 6, wherein each of the plurality of third option paytables has a respective average expected payback which is higher than an average expected payback of the second paytable.

8. The gaming system of claim 7, wherein the average expected paybacks of at least two of the plurality of third option paytables are different.

9. The gaming system of claim 1, wherein the secondary game and the primary game are different games.

10. The gaming system of claim 1, wherein the secondary game is the same as the primary game.

11. The gaming system of claim 1, wherein, if the player selects the at least one second different option, the plurality of instructions, when executed by the at least one processor, cause the at least one processor to sequentially require the player to place the respective required additional wager for each of the number of plays of the secondary game associated with the at least one second different option.

12. The gaming system of claim 1, wherein, if the player selects the at least one second different option, the plurality of instructions, when executed by the at least one processor, cause the at least one processor to require the player to place the respective required additional wagers for all of the number of plays of the secondary game associated with the at least one second different option up front.

13. A gaming system comprising:

at least one input device;

at least one display device;

at least one processor; and at least one memory device which stores a plurality of instructions which, when executed by the at least one processor, cause the at least one processor to operate with the at least one display device and the at least one input device to:

(a) enable a player to place a primary game wager on a play of a primary game, said play of the primary game employing a first paytable;

(b) if said primary game wager is placed, determine and display a primary game outcome;

(c) determine and provide any awards based on the determined primary game outcome in accordance with the first paytable; and (d) upon an occurrence of a designated triggering event:

(i) initiate a bonus mode;

(ii) after the bonus mode is initiated, display a plurality of options associated with a secondary game, including a first default option and at least one second different option, each of said plurality of options associated with a respective number of one or more plays of the secondary game, the number of plays of the secondary game associated with the at least one second different option being at least two;

(iii) enable the player to select one of the displayed options;

(iv) if the player selects the first default option, for each of the number of plays of the secondary game associated with said first default option:

(A) determine and display a secondary game outcome without requiring any additional wager by the player, and (B) determine and provide any awards based on the determined secondary game outcome in accordance with a second paytable; and (v) if the player selects the at least one second different option:

(A) enable the player to place an additional required wager for one of the number of plays of the secondary game associated with the at least one second different option;

(B) if the player places the additional required wager:

(1) determine and display a secondary game outcome;

(2) provide any awards based on the determined secondary game outcome in accordance with a third paytable;

(3) if any of the number of plays of the secondary game associated with the at least one second different option remain, repeat (v)(A) to (v)(C) for one of said remaining plays of the secondary game; and (4) if none of the number of plays of the secondary game associated with the at least one second different option remain, terminate the bonus mode; and (C) if the player does not place the additional required wager, terminate the bonus mode.

14. The gaming system of claim 13, wherein the first and second paytables are the same.

15. The gaming system of claim 14, wherein the second and third paytables are different.

16. The gaming system of claim 15, wherein the third paytable has an average expected payback which is higher than an average expected payback of the second paytable.

17. The gaming system of claim 13, wherein said display of the plurality of options associated with the secondary game includes: (i) an explanation that the first default option does not require any additional wager by the player for each of the number of plays of the secondary game associated with the first default option, and (ii) an explanation that the at least one second different option requires the additional wager by the player for each of the number of plays of the secondary game associated with the at least one second different option.

18. The gaming system of claim 13, wherein the at least one second different option includes plurality of second different options, each of said second different options being associated with a different one of a plurality of third paytables including the third paytable.

19. The gaming system of claim 18, wherein each of the plurality of third paytables has a respective average expected payback which is higher than an average expected payback of the second paytable.

20. The gaming system of claim 19, wherein at least two of the average expected paybacks of the plurality of third paytables are different.

21. The gaming system of claim 13, wherein the secondary game and the primary game are different games.

22. The gaming system of claim 13, wherein the secondary game is the same as the primary game.

* * * * *